US010699226B1

United States Patent
Lyons et al.

(10) Patent No.: US 10,699,226 B1
(45) Date of Patent: Jun. 30, 2020

(54) SYSTEMS AND METHODS FOR AUTOMATICALLY GENERATING AND PROVIDING A COMPLIANCE NOTIFICATION FOR A DOCMENT IN RESPONSE TO A COMPLIANCE REQUEST RECEIVED FROM AN ELECTRONIC DEVICE VIA A NETWORK

(71) Applicant: Governance Sciences Group, Inc., Incline Village, NV (US)

(72) Inventors: Kevin James Lyons, Incline Village, NV (US); Glenn Richard Korban, La Verne, CA (US)

(*) Notice: Subject to any disclaimer, the term of this patent is extended or adjusted under 35 U.S.C. 154(b) by 0 days.

(21) Appl. No.: 16/110,975

(22) Filed: Aug. 23, 2018

Related U.S. Application Data

(63) Continuation of application No. 14/586,954, filed on Dec. 30, 2014, now abandoned.

(60) Provisional application No. 61/922,273, filed on Dec. 31, 2013.

(51) Int. Cl.
 *G06Q 10/06* (2012.01)
 *H04L 29/08* (2006.01)

(52) U.S. Cl.
 CPC ...... *G06Q 10/063114* (2013.01); *H04L 67/10* (2013.01)

(58) Field of Classification Search
 None
 See application file for complete search history.

(56) References Cited

U.S. PATENT DOCUMENTS

| 8,479,257 B1* | 7/2013 | Lloyd | H04L 63/20 726/1 |
| 8,499,331 B1* | 7/2013 | Yehuda | H04L 41/5006 709/223 |
| 9,465,778 B1* | 10/2016 | DeBo | G06Q 10/063 |

(Continued)

FOREIGN PATENT DOCUMENTS

| WO | WO2004063960 | 7/2004 | |
| WO | WO-2004063960 A1 * | 7/2004 | ............. G06F 21/10 |

(Continued)

OTHER PUBLICATIONS

Gordon, Lilli A., and John Pound. "Information, ownership structure, and shareholder voting: Evidence from shareholder-sponsored corporate governance proposals." The Journal of Finance 48.2 (1993): 697-718. (Year: 1993).*

(Continued)

*Primary Examiner* — Matthew S Gart
*Assistant Examiner* — Derick J Holzmacher
(74) *Attorney, Agent, or Firm* — Shant Tchakerian

(57) ABSTRACT

Systems and methods for automatically generating and providing a compliance notification for a document in response to a compliance request received from an electronic device via a network. A governance system is constructed to communicate with a first governing agent device, a first principal device and a second principal device via the Internet. The first governing agent device provides a first document to the governance system, and the governance system compares the first document with stored permissions and at least one permission generated in real-time by a first personal robot representative. The governance system provides a result of the comparison to the first governing agent device.

8 Claims, 15 Drawing Sheets

(56) References Cited

U.S. PATENT DOCUMENTS

| | | | | |
|---|---|---|---|---|
| 2003/0065641 | A1* | 4/2003 | Chaloux | G09B 7/00 |
| 2003/0182177 | A1* | 9/2003 | Gallagher | G06Q 10/0631 |
| | | | | 705/7.12 |
| 2003/0195858 | A1* | 10/2003 | Watanabe | G06Q 20/0855 |
| | | | | 705/75 |
| 2004/0019500 | A1* | 1/2004 | Ruth | G06Q 10/02 |
| | | | | 705/5 |
| 2004/0193703 | A1* | 9/2004 | Loewy | H04L 41/0893 |
| | | | | 709/220 |
| 2005/0075916 | A1* | 4/2005 | Lathram | G06Q 10/06 |
| | | | | 705/7.36 |
| 2007/0283410 | A1* | 12/2007 | Hsu | G06F 16/27 |
| | | | | 726/1 |
| 2007/0294209 | A1* | 12/2007 | Strub | H04L 63/102 |
| 2008/0243933 | A1* | 10/2008 | Holtzman | G06Q 10/06 |
| 2008/0270207 | A1* | 10/2008 | Santos | G06Q 10/06395 |
| | | | | 705/7.41 |
| 2009/0089126 | A1* | 4/2009 | Odubiyi | G06F 17/271 |
| | | | | 705/7.39 |
| 2009/0089195 | A1* | 4/2009 | Salomon | G06Q 10/10 |
| | | | | 705/35 |
| 2009/0119141 | A1* | 5/2009 | McCalmont | G06Q 10/0637 |
| | | | | 705/7.41 |
| 2009/0228337 | A1* | 9/2009 | Swindon | G06Q 10/10 |
| | | | | 705/7.32 |
| 2010/0161371 | A1* | 6/2010 | Cantor | G06Q 10/063 |
| | | | | 705/7.11 |
| 2010/0324952 | A1* | 12/2010 | Bastos | G06Q 10/00 |
| | | | | 705/7.28 |
| 2011/0093471 | A1* | 4/2011 | Brockway | G06F 21/10 |
| | | | | 707/747 |
| 2011/0213643 | A1* | 9/2011 | Eiben | G06Q 10/00 |
| | | | | 705/12 |
| 2012/0054594 | A1* | 3/2012 | Isaacson | H04L 12/1827 |
| | | | | 715/230 |
| 2012/0102543 | A1* | 4/2012 | Kohli | H04L 63/20 |
| | | | | 726/1 |
| 2013/0311222 | A1* | 11/2013 | Chaturvedi | G06Q 10/06398 |
| | | | | 705/7.15 |
| 2014/0331277 | A1* | 11/2014 | Frascadore | H04L 63/20 |
| | | | | 726/1 |
| 2015/0220649 | A1* | 8/2015 | Papa | G06F 16/93 |
| | | | | 707/722 |

FOREIGN PATENT DOCUMENTS

| | | | | |
|---|---|---|---|---|
| WO | WO2007068121 | | 6/2007 | |
| WO | WO-2007068121 A1 | * | 6/2007 | G06Q 10/10 |
| WO | WO-2008121960 A1 | * | 10/2008 | G06Q 10/10 |
| WO | WO-2009034415 A2 | * | 3/2009 | G06Q 10/0635 |
| WO | WO2014124270 | | 8/2014 | |
| WO | WO-2014124270 A2 | * | 8/2014 | G06Q 10/0637 |

OTHER PUBLICATIONS

Lenssen, Gilbert, et al. "Stakeholder governance: how stakeholders influence corporate decision nnaking." Corporate Governance: The international journal of business in society (2010). (Year: 2010).*

John, Kose, Lubomir Litov, and Bernard Yeung. "Corporate governance and risk-taking." The journal of finance 63.4 (2008): 1679-1728. (Year: 2008).*

Kaufman, Allen, and Ernie Englander. "A team production model of corporate governance." Academy of Management Perspectives 19.3 (2005): 9-22. (Year: 2005).*

* cited by examiner

SYSTEMS AND METHODS FOR AUTOMATICALLY GENERATING AND PROVIDING A COMPLIANCE NOTIFICATION FOR A DOCMENT IN RESPONSE TO A COMPLIANCE REQUEST RECEIVED FROM AN ELECTRONIC DEVICE VIA A NETWORK

CROSS REFERENCE TO RELATED APPLICATIONS

This application is a continuation of U.S. application Ser. No. 14/586,954, filed 30 Dec. 2014, which claims the benefit of U.S. Provisional Application Ser. No. 61/922,273, filed Dec. 31, 2013, all of which are incorporated in their entirety by this reference.

FIELD

The present disclosure relates to automatically generating and providing a compliance notification for a document in response to a compliance request received from an electronic device via a network.

BACKGROUND

In a principal-agent relationship, a principal delegates rights and duties to be exercised and performed independently by one agent. In a governance context, a group of individual principals delegates rights and duties to one or more governing agents. The governance context typically arises from principals having collectively contributed assets (funds and property) and/or behavioral obligations (rights and duties) into a common pools to be managed by governing agents in a way that delivers maximum possible net benefits to everyone who contributed and committed resources to the common pool arrangement.

SUMMARY

Better governance requires better defining, monitoring, reviewing intervening in and incentivizing governing activities, thus better dissuading governing agents from doing things they are not supposed to do for principals, and better persuading governing agents to do things that they are supposed to do for principals.

In an example embodiment, a processing unit of a governance management server is used to generate governance permissions for at least one governance group, the governance group including at least one principal of a governance principal-agent relationship, the governance permissions for each governance group being generated from received principal input from at least one principal device of a principal of the governance group.

According to an aspect, the processing unit is used to determine selection of at least one governance group; the processing unit is used to compare the generated governance permissions of the selected at least one governance group with encoded governing activity information to determine compliance of at least one governing activity specified in the encoded governing activity information with the governance permissions of the selected at least one governance group; and the processing unit is used to provide a governing activity compliance notification to at least one of a principal device and a governing agent device, the governing activity compliance notification including governing activity compliance information indicating compliance of each governing activity specified in the encoded governing activity information.

According to an aspect, the encoded governing activity information includes at least governing policy information.

According to an aspect, the encoded governing activity information is generated by encoding governing activity information, the received governing activity information being encoded by at least one of the processing unit of the governance management server, at least one governing agent device, and at least one principal device. The governing activity information to be encoded is received from at least one of the processing unit of the governance management server, at least one governing agent device, and at least one principal device.

According to an aspect, the processing unit is used to generate a governing activity compliance score based on the determined compliance of the encoded governing activity information, the governing activity compliance score being included in the governing activity compliance notification.

According to an aspect, the governance permissions include at least one governance permission and a corresponding value, and wherein the encoded governing activity information includes at least one governance permission and a corresponding value. The processing unit performs the comparing by, for each governance permission of the encoded governing activity information, determining if the governance permission is included in the governance permissions of the selected at least one governance group. Responsive to a determination that the governance permission is included in the governance permissions of the selected at least one governance group, determining compliance of each governing activity based on a determination that a value of the corresponding governance permission included in the encoded governing activity information matches a value of the governance permission included in the governance permissions. Responsive to a determination that the governance permission is not included in the governance permissions of the selected at least one governance group, providing at least one principal device of the governance group with a request to provide principal input to be used to determine a governance permission value for the governance permission that is included in the encoded governing activity information and not included in the governance permissions for the selected at least one governance group.

According to an aspect, the processing unit is used to generate governance permissions from received governance charter information.

According to an aspect, responsive to reception of the governing activity compliance notification by a principal device, a processing unit of the principal device controls display of governing activity compliance notification on a display of the principal device based on the received governing activity compliance notification.

According to an aspect, responsive to reception of the governing activity compliance notification by a governing agent device, a processing unit of the governing agent device controls display of governing activity compliance notification on a display of the governing agent device based on the received governing activity compliance notification.

According to an aspect, the governance management server is a public government governance management server.

According to an aspect, the processing unit includes at least one machine-readable storage medium and one or more processors, the one or more processors being communicatively coupled to the at least one machine-readable storage medium, the one or more processors of the processing unit receiving instructions stored by the at least one machine-readable storage medium via a bus, and the one or more processors executing the received instructions.

According to an aspect, the processing unit is at least one of an ASIC (Application-Specific Integrated Circuit) and a SoC (System-on-Chip).

According to an aspect, the processing unit is used to provide the stored governance management permissions responsive to a request for obtaining the governance permissions.

According to an aspect, the governance permissions include at least one governance permission and a corresponding value, and wherein the encoded governing activity information includes at least one governance permission and a corresponding value.

According to an aspect, the processing unit is used to generate governing activity assignment information based on activity information provided by at least two principals, the governing activity assignment information indicating at least one governing activity and a corresponding governing agent assigned to the governing activity. The processing unit provides the governing activity assignment information responsive to a request for the governing activity assignment information.

According to an aspect, the governance management server stores governing activity monitoring information based on at least one of activity review information provided by at least one principal device and governing information provided by at least one database of at least one governing entity of which the governing agent is a member, the governing activity monitoring information indicating a status of at least one governing activity that is assigned to at least one governing agent. The processing unit is used to provide the governing activity monitoring information responsive to a request for the governing activity monitoring information.

According to an aspect, the processing unit is used to provide at least one activity notification to at least one principal device based on the stored governing activity monitoring information.

According to an aspect, the at least one activity notification includes civic task information for a task to be performed by a principal of the at least one principal device.

According to an aspect, the civic task information includes information to assist a principal of the at least one principal device in responding to a governing agent's failure to complete an assigned governing activity.

According to an aspect, the processing unit is used to provide activity review incentive information to at least one principal device to encourage submission of activity review information to the governance management server from the at least one principal device.

According to an aspect, the processing unit is used to provide civic task incentive information to at least one principal device to encourage performance of at least one civic task by a user of the principal device.

According to an aspect, the governing activity compliance information indicating compliance of at least one governing activity parameter specified in the encoded governing activity information.

This brief summary has been provided so that the nature of this disclosure may be understood quickly. A more complete understanding can be obtained by reference to the following detailed description and to the attached drawings.

DETAILED DESCRIPTION

FIG. 1

Figure 1:
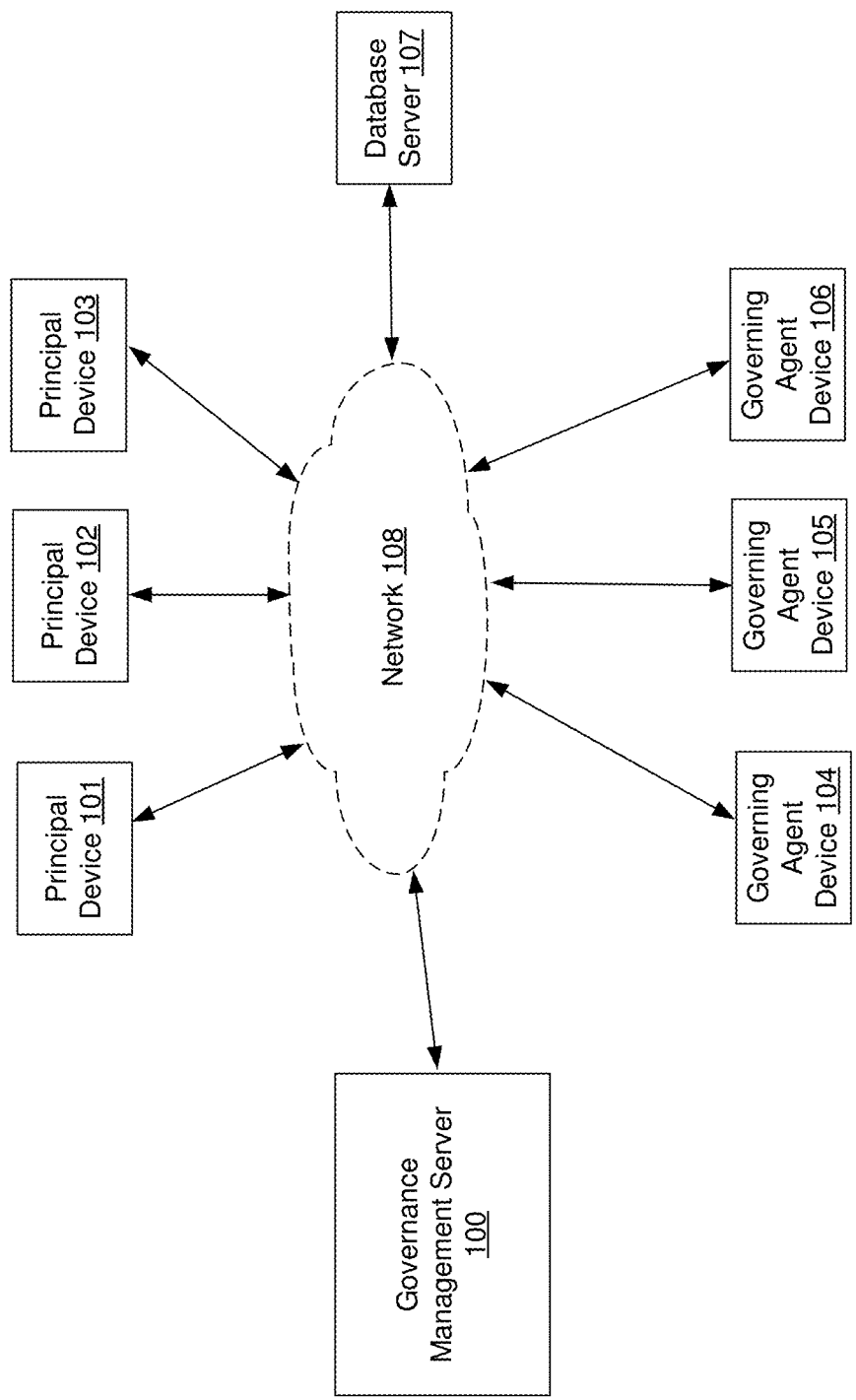
FIG. 1 is network diagram according to an example embodiment.

FIG. 1 is network diagram according to an example embodiment. In an example implementation depicted in FIG. 1, a governance management server 100 is communicatively coupled with a plurality of principal devices 101-103 and a plurality of governing agent devices 104-106 via a network 108. In the example implementation, each principal device 101-103 is associated with a principal of a governance principal-agent relationship, and each governing agent device 104-106 is associated with a governing agent of the governance principal-agent relationship.

In the example implementation, the governance management server 100 is also communicatively coupled via the network 108 to at least one database server 107 of at least one governing entity of which each governing agent is a member.

In the example implementation, the principals of the principal devices 101-103 are members of at least one governance group.

In the example implementation, the network 108 is the Internet.

FIG. 2

Figure 2:
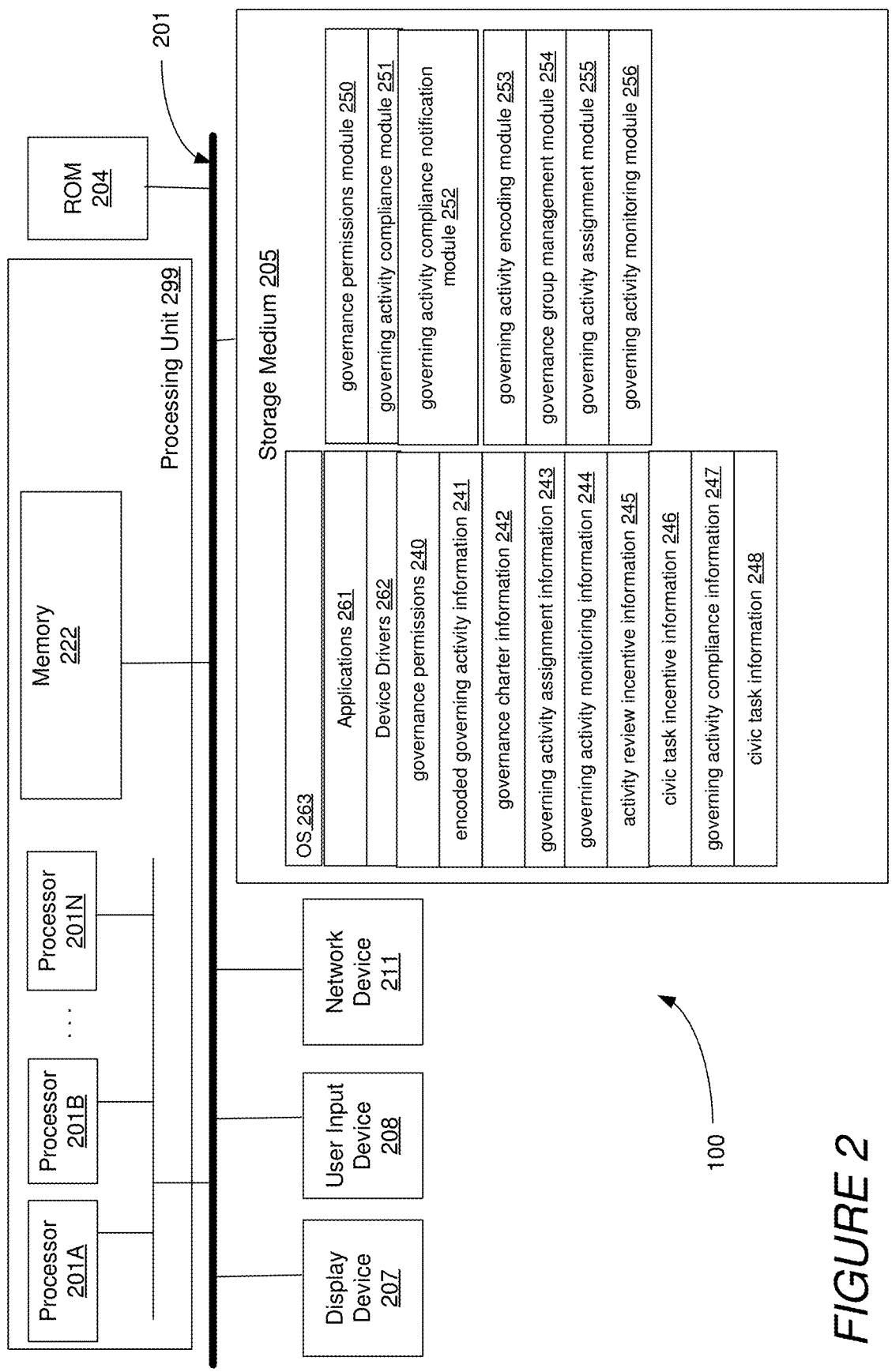
FIG. 2 is a diagram depicting the internal architecture of the governance management server 100 of FIG. 1 according to an example embodiment.

FIG. 2 is a diagram depicting the internal architecture of the governance management server 100 of FIG. 1 according to an example embodiment. In the example embodiment, the governance management server 100 is a server device.

The bus 201 interfaces with the processors 201A-201N, the main memory (e.g., a random access memory (RAM)) 222, a read only memory (ROM) 204, a processor-readable storage medium 205, a display device 207, a user input device 208, and a network device 211.

The processors 201A-201N may take many forms, such as ARM processors, X86 processors, and the like.

In some implementations, the governance management server 100 includes at least one of a central processing unit (processor) and a multi-processor unit (MPU).

The processors 201A-201N and the main memory 222 form a processing unit 299. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 211 provides one or more wired or wireless interfaces for exchanging data and commands between the governance management server 100 and other devices, such as, for example the principal devices 101-103, the governing agent devices 104-106, and the database server 107. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 222 (of the processing unit 299) from the processor-readable storage medium 205, the ROM 204 or any other storage location. During execution of these software programs, the respective machine-executable instructions are accessed by at least one of processors 201A-201N (of the host processing unit 299) via the bus 201, and then executed by at least one of processors 201A-201N. Data used by the software programs are also stored in the memory 222, and such data is accessed by at least one of processors 201A-201N during execution of the machine-executable instructions of the software programs.

The processor-readable (machine-readable) storage medium 205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 205 includes applications 261, device drivers 262, and an operating system 263.

The processor-readable storage medium 205 includes governance permissions information 240, encoded governing activity information 241, governance charter information 242, governing activity assignment information 243, governing activity monitoring information 244, activity review incentive information 245, civic task incentive information 246, governing activity compliance information 247, and civic task information 248.

The processor-readable storage medium 205 also includes, a governance permissions module 250, a governing activity compliance module 251, a governing activity compliance notification module 252, a governing activity encoding module 253, a governance group management module 254, a governing activity assignment module 255, a governing activity monitoring module 256.

The governance group management module 254 includes machine-readable instructions that when executed by the processing unit 299 cause the governance management server 100 to manage contact information for principals of each governance group and manage governance permission for each governance group. In the example implementation, the contact information for principals of each governance group includes at least on of e-mail, telephone, instant messaging, and social media application contact information.

The governance permissions module 250 includes machine-readable instructions that when executed by the processing unit 299 cause the governance management server 100 to generate governance permissions 240 for at least one governance group managed by the governance group management module 254, the governance group including at least one principal of a governance principal-agent relationship, the governance permissions for each governance group being generated from received principal input from at least one principal device (e.g., 101-101) of a principal of the governance group.

The governing activity compliance module 251 includes machine-readable instructions that when executed by the processing unit 299 cause the governance management server 100 to determine selection of at least one governance group managed by the governance group management module 254, compare the generated governance permissions 240 of the selected at least one governance group with the encoded governing activity information 241 to determine compliance of at least one governing activity specified in the encoded governing activity information 241 with the governance permissions 240 of the selected at least one governance group.

The governing activity compliance notification module 252 includes machine-readable instructions that when executed by the processing unit 299 cause the governance management server 100 to provide a governing activity compliance notification to at least one of a principal device (e.g., 101-103) and a governing agent device (e.g., 104-106), the governing activity compliance notification including governing activity compliance information 247 indicating compliance of each governing activity specified in the encoded governing activity information 241.

In the example embodiment, the encoded governing activity information 241 includes at least governing policy information. In the example embodiment, the encoded governing activity information 241 is generated by encoding received un-encoded governing activity information, the received governing activity information being encoded by at least one of the processing unit 299 of the governance management server 100, at least one governing agent device (e.g., 104-106), and at least one principal device (e.g., 101-103). The received governing activity information to be encoded is received from at least one of the processing unit 299 of the governance management server 100, at least one governing agent device (e.g., 104-106), and at least one principal device (e.g., 101-103).

In the example embodiment, the governing activity encoding module 253 includes machine-readable instructions that when executed by the processing unit 299 cause the governance management server 100 to encoding received un-encoded governing activity information.

In the example embodiment, the governing activity compliance module 251 includes machine-readable instructions that when executed by the processing unit 299 cause the governance management server 100 to generate a governing activity compliance score based on the determined compliance of the encoded governing activity information 241, the governing activity compliance score being included in the governing activity compliance notification provided by the governing activity compliance notification module 252.

In the example embodiment, the governance permissions 240 include at least one governance permission and a corresponding value, and the encoded governing activity information 241 includes at least one governance permission and a corresponding value. The processing unit 299 performs the comparing by, for each governance permission of the encoded governing activity information 241, determining if the governance permission is included in the governance permissions 240 of the selected at least one governance group. Responsive to a determination that the governance permission is included in the governance permissions 240 of the selected at least one governance group, the processing unit 299 determines compliance of each governing activity based on a determination that a value of the corresponding governance permission included in the encoded governing activity information 241 matches a value of the governance permission included in the governance permissions 240. Responsive to a determination that the governance permission is not included in the governance permissions 240 of the selected at least one governance group, the processing unit 299 provides at least one principal device (e.g., 101-103) of the governance group with a request to provide principal input to be used to determine a governance permission value for the governance permission that is included in the encoded governing activity information 241 and not included in the governance permissions 240 for the selected at least one governance group.

In an example embodiment, the processing unit 299 generates governance permissions from received governance charter information 242.

In the example embodiment, responsive to reception of the governing activity compliance notification by a principal device (e.g., 101-103), a processing unit of the principal device controls display of governing activity compliance notification on a display of the principal device based on the received governing activity compliance notification.

Responsive to reception of the governing activity compliance notification by a governing agent device (e.g., 104-106), a processing unit of the governing agent device controls display of governing activity compliance notification on a display of the governing agent device based on the received governing activity compliance notification.

In the example embodiment, the governance management server 100 is a public government governance management server.

In the example embodiment, the governance permissions module 250 includes machine-readable instructions that when executed by the processing unit 299 cause the governance management server 100 to provide the stored governance management permissions 240 responsive to a request for obtaining the governance permissions (e.g., from at least one of a principal device 101-103 and a governing agent device 104-106).

In the example embodiment, the governance permissions 240 include at least one governance permission and a corresponding value, and the encoded governing activity information 241 includes at least one governance permission and a corresponding value.

In the example embodiment, the governing activity assignment module 255 includes machine-readable instructions that when executed by the processing unit 299 cause the governance management server 100 to generate governing activity assignment information 243 based on activity information provided by at least two principals (e.g., of the devices 101-103), the governing activity assignment information 243 indicating at least one governing activity and a corresponding governing agent (e.g., of a device 104-106) assigned to the governing activity. The governing activity assignment module 255 includes machine-readable instructions that when executed by the processing unit 299 cause the governance management server 100 to provide the governing activity assignment information responsive to a request for the governing activity assignment information (e.g., from one of a principal device 101-103 and a governing agent device 104-106).

In the example embodiment, the governing activity monitoring information 244 is generated based on at least one of activity review information provided by at least one principal device (e.g., 101-103) and governing information provided by at least one database (e.g., provided by the database server 107) of at least one governing entity of which the governing agent is a member. The governing activity monitoring information 244 indicates a status of at least one governing activity that is assigned to at least one governing agent (e.g., of a device 104-106).

In the example embodiment, the governing activity monitoring module 256 includes machine-readable instructions that when executed by the processing unit 299 cause the governance management server 100 to provide the governing activity monitoring information 244 responsive to a request for the governing activity monitoring information (e.g., from one of principal devices 101-103 and governing agent devices 104-106). The governing activity monitoring module 256 includes machine-readable instructions for receiving at least one of activity review information provided by at least one principal device (e.g., 101-103) and governing information provided by at least one database (e.g., provided by the database server 107) of at least one governing entity of which the governing agent is a member.

The governing activity monitoring module 256 includes machine-readable instructions that when executed by the processing unit 299 cause the governance management server 100 to provide at least one activity notification to at least one principal device (e.g., 101-103) based on the stored governing activity monitoring information 244.

In the example embodiment, the at least one activity notification includes civic task information for a task to be performed by a principal of the at least one principal device (e.g,. 101-103). In the example embodiment, the civic task information 248 includes information to assist a principal of the at least one principal device in responding to a governing agent's failure to complete an assigned governing activity.

In the example embodiment, governing activity monitoring module 256 includes machine-readable instructions that when executed by the processing unit 299 cause the governance management server 100 to provide activity review incentive information 245 to at least one principal device (e.g, 101-103) to encourage submission of activity review information to the governance management server 100 from the principal device.

The governing activity monitoring module 256 includes machine-readable instructions that when executed by the processing unit 299 cause the governance management server 100 to provide civic task incentive information 246 to at least one principal device (e.g., 101-103) to encourage performance of at least one civic task by a user of the principal device.

In the example embodiment, the governing activity compliance information 247 indicates compliance of at least one governing activity parameter specified in the encoded governing activity information 241.

FIG. 3

Figure 3:
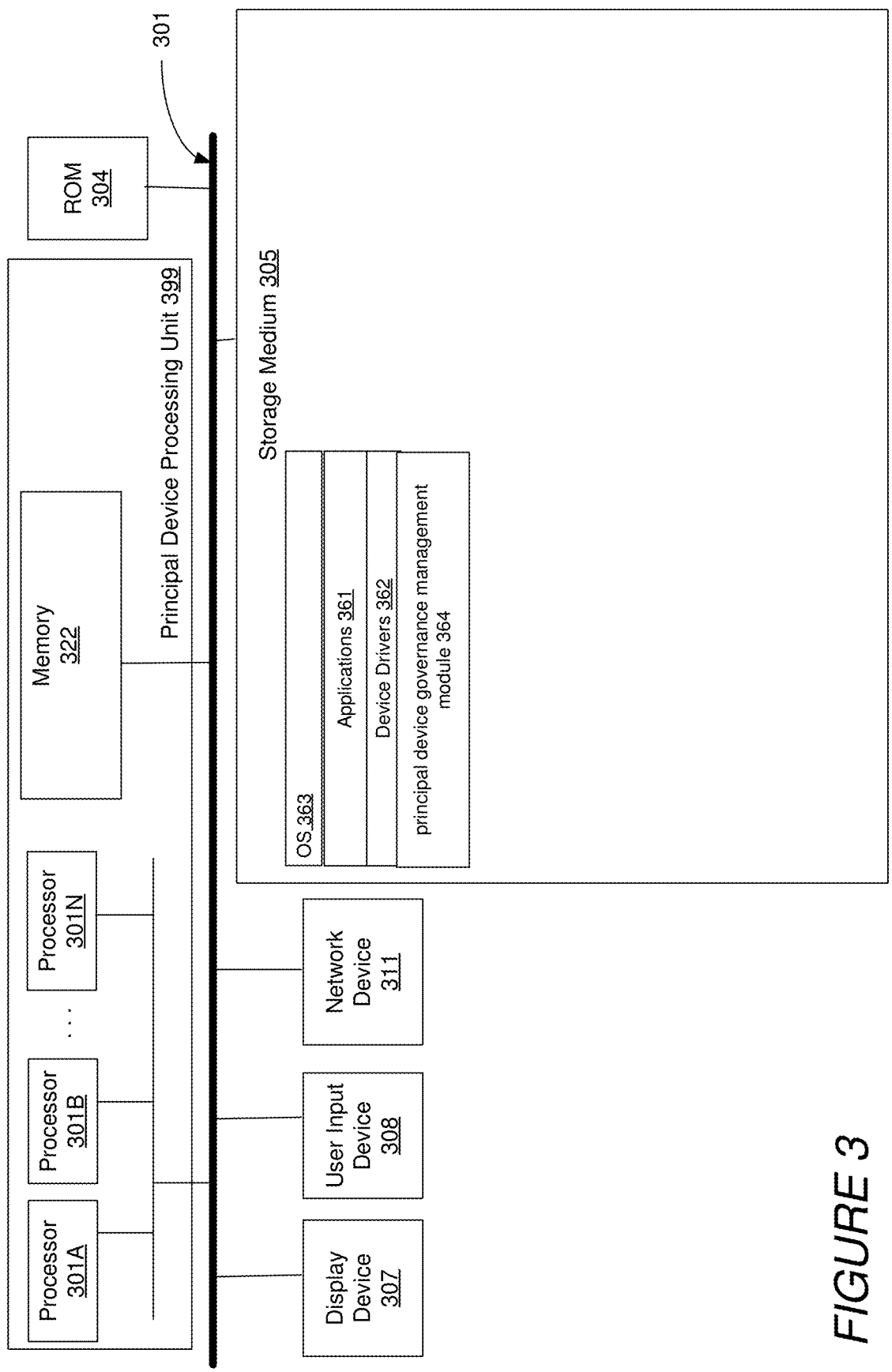
FIG. 3 is a diagram depicting the internal architecture of a principal device according to an example embodiment.

FIG. 3 is a diagram depicting the internal architecture of a principal device (e.g., one of the principal devices 101-103 of FIG. 1), according to an example embodiment.

The bus 301 interfaces with the processors 301A-301N, the main memory (e.g., a random access memory (RAM)) 322, a read only memory (ROM) 304, a processor-readable storage medium 305, a display device 307, a user input device 308, and a network device 311.

The processors 301A-301N may take many forms, such as ARM processors, X86 processors, and the like.

In some implementations, the principal device (e.g., one of the principal devices 101-103 of FIG. 1) includes at least one of a central processing unit (processor) and a multi-processor unit (MPU).

The processors 301A-301N and the main memory 322 form a principal device processing unit 399. In some embodiments, the principal device processing unit includes one or more processors communicatively coupled to one or more of a RAM, ROM, and machine-readable storage medium; the one or more processors of the principal device processing unit receive instructions stored by the one or more of a RAM, ROM, and machine-readable storage medium via a bus; and the one or more processors execute the received instructions. In some embodiments, the principal device processing unit is an ASIC (Application-Specific Integrated Circuit). In some embodiments, the principal device processing unit is a SoC (System-on-Chip).

The network adapter device 311 provides one or more wired or wireless interfaces for exchanging data and commands between the principal device processing unit of the principal device (e.g., one of the principal devices 101-103 of FIG. 1) and other devices, such as, for example the governance management server 100. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 322 (of the processing unit 399) from the processor-readable storage medium 305, the ROM 304 or any other storage location. During execution of these software programs, the respective machine-executable instructions are accessed by at least one of processors 301A-301N (of the processing unit 399) via the bus 301, and then executed by at least one of processors 301A-301N. Data used by the software programs are also stored in the memory 322, and such data is accessed by at least one of processors 301A-301N during execution of the machine-executable instructions of the software programs.

The processor-readable storage medium 305 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 305 includes applications 361, device drivers 362, an operating system 363, and a governance management module 364.

The principal device governance management module 364 includes machine-readable instructions that when executed by the principal device processing unit 399 cause the principle device to perform the processes of the principle device described herein.

FIG. 4

Figure 4:
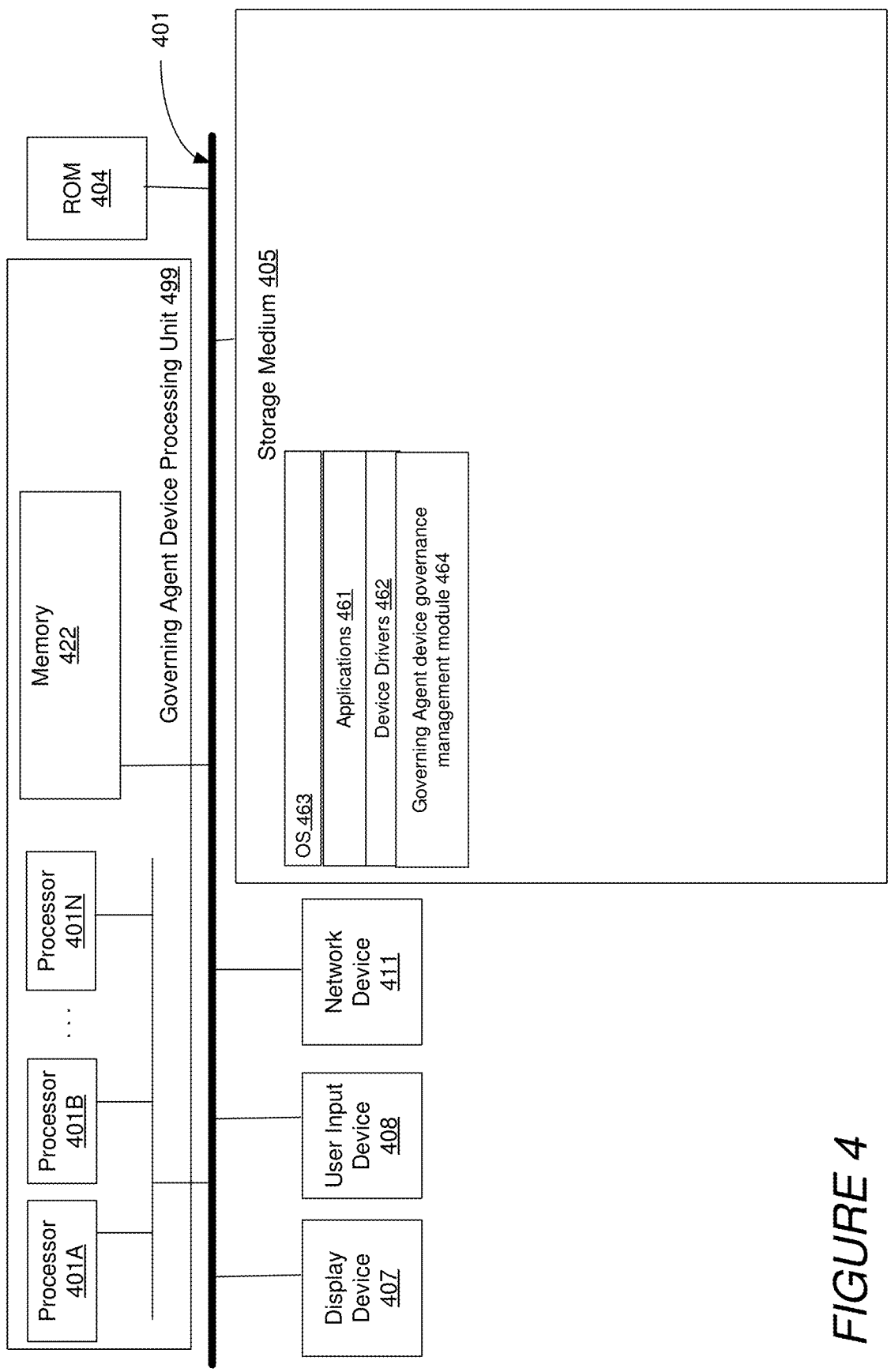
FIG. 4 is a diagram depicting the internal architecture of a governing agent device according to an example embodiment.

FIG. 4 is a diagram depicting the internal architecture of a governing agent device (e.g., one of the governing agent devices 104-106 of FIG. 1), according to an example embodiment.

The bus 401 interfaces with the processors 401A-401N, the main memory (e.g., a random access memory (RAM)) 422, a read only memory (ROM) 404, a processor-readable storage medium 405, a display device 407, a user input device 408, and a network device 411.

The processors 401A-401N may take many forms, such as ARM processors, X86 processors, and the like.

In some implementations, the governing agent device (e.g., one of the governing agent devices 104-106 of FIG. 1) includes at least one of a central processing unit (processor) and a multi-processor unit (MPU).

The processors 401A-401N and the main memory 422 form a governing agent device processing unit 499. In some embodiments, the governing agent device processing unit includes one or more processors communicatively coupled to one or more of a RAM, ROM, and machine-readable storage medium; the one or more processors of the governing agent device processing unit receive instructions stored by the one or more of a RAM, ROM, and machine-readable storage medium via a bus; and the one or more processors execute the received instructions. In some embodiments, the governing agent device processing unit is an ASIC (Application-Specific Integrated Circuit). In some embodiments, the governing agent device processing unit is a SoC (System-on-Chip).

The network adapter device 411 provides one or more wired or wireless interfaces for exchanging data and commands between the governing agent device processing unit of the governing agent device (e.g., one of the governing agent devices 104-106 of FIG. 1) and other devices, such as, for example the governance management server 100. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 422 (of the processing unit 499) from the processor-readable storage medium 405, the ROM 404 or any other storage location. During execution of these software programs, the respective machine-executable instructions are accessed by at least one of processors 401A-401N (of the processing unit 499) via the bus 401, and then executed by at least one of processors 401A-401N. Data used by the software programs are also stored in the memory 422, and such data is accessed by at least one of processors 401A-401N during execution of the machine-executable instructions of the software programs.

The processor-readable storage medium 405 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 405 includes applications 461, device drivers 462, an operating system 463, and a governance management module 464.

Figure 5:
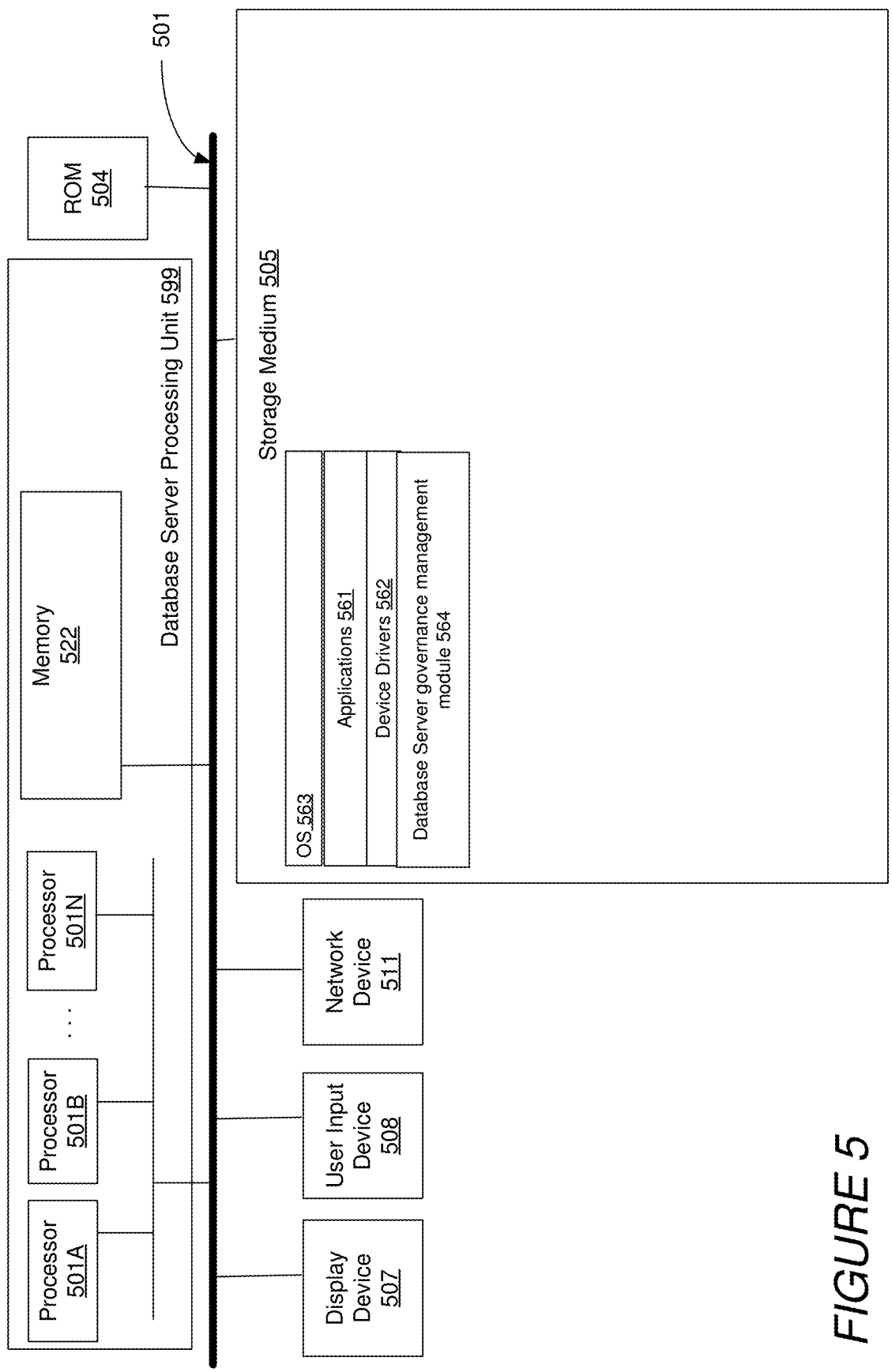
FIG. 5 is a diagram depicting the internal architecture of a database server according to an example embodiment.

The governing agent device governance management module 464 includes machine-readable instructions that when executed by the governing agent device processing unit 499 cause the governing agent device to perform the processes of the governing agent device described herein.
FIG. 5

FIG. 5 is a diagram depicting the internal architecture of the database server 107, according to an example embodiment.

The bus 501 interfaces with the processors 501A-501N, the main memory (e.g., a random access memory (RAM)) 522, a read only memory (ROM) 504, a processor-readable storage medium 505, a display device 507, a user input device 508, and a network device 511.

The processors 501A-501N may take many forms, such as ARM processors, X86 processors, and the like.

In some implementations, the database server 107 includes at least one of a central processing unit (processor) and a multi-processor unit (MPU).

The processors 501A-501N and the main memory 522 form a database server processing unit 599. In some embodiments, the database server processing unit includes one or more processors communicatively coupled to one or more of a RAM, ROM, and machine-readable storage medium; the one or more processors of the database server processing unit receive instructions stored by the one or more of a RAM, ROM, and machine-readable storage medium via a bus; and the one or more processors execute the received instructions. In some embodiments, the database server processing unit is an ASIC (Application-Specific Integrated Circuit). In some embodiments, the database server processing unit is a SoC (System-on-Chip).

The network adapter device 511 provides one or more wired or wireless interfaces for exchanging data and commands between the database server processing unit of the database server 107 and other devices, such as, for example the governance management server 100. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 522 (of the processing unit 599) from the processor-readable storage medium 505, the ROM 504 or any other storage location. During execution of these software programs, the respective machine-executable instructions are accessed by at least one of processors 501A-501N (of the processing unit 599) via the bus 501, and then executed by at least one of processors 501A-501N. Data used by the software programs are also stored in the memory 522, and such data is accessed by at least one of processors 501A-501N during execution of the machine-executable instructions of the software programs.

The processor-readable storage medium 505 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 505 includes applications 561, device drivers 562, an operating system 563. In the example implementation, the processor-readable storage medium 505 includes a governance management module 564. In some implementations, the processor-readable storage medium does not include a governance management module.

Figure 6:
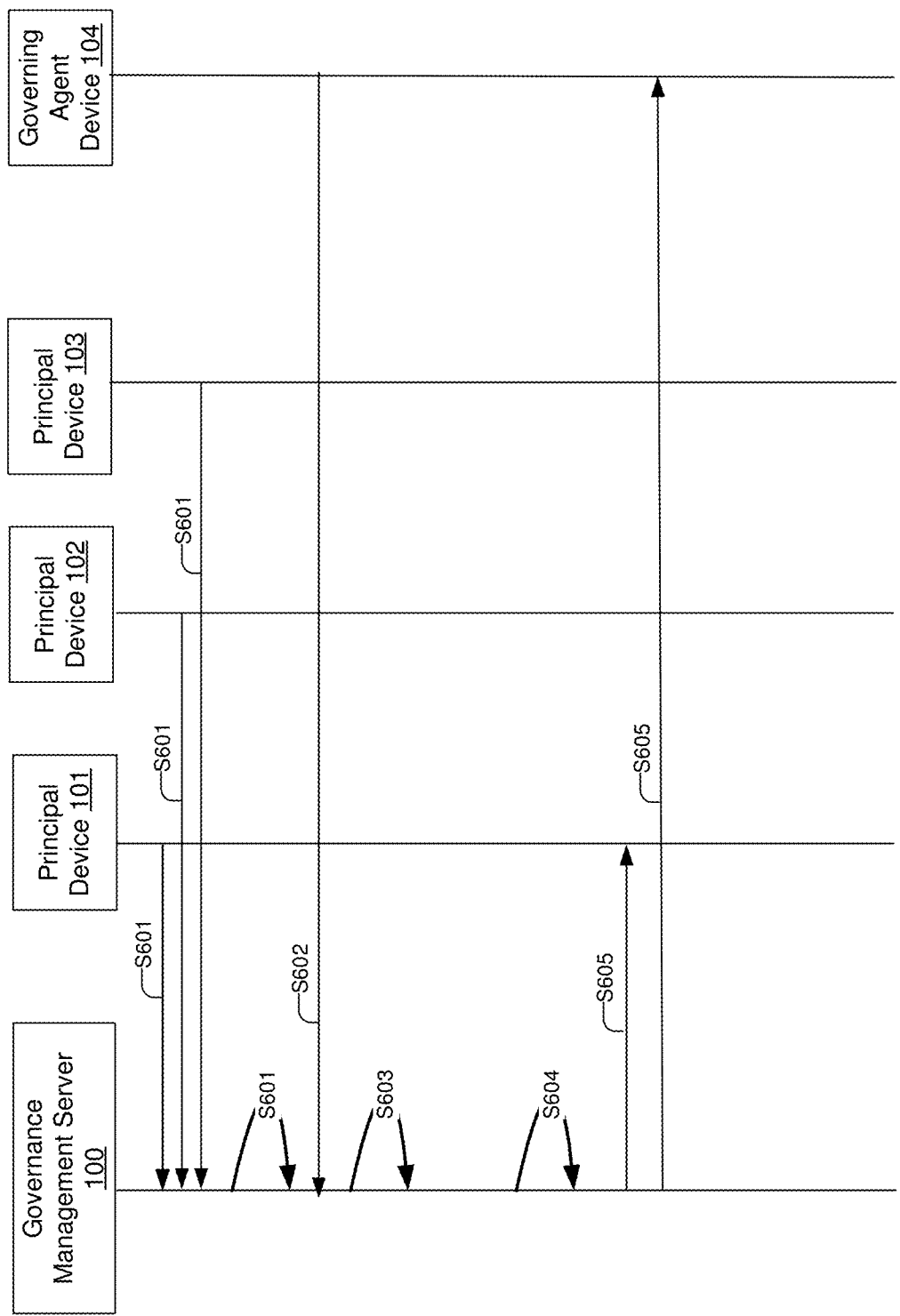
FIG. 6 is a sequence diagram for explaining processing performed by the governance management server 100 of FIG. 1 according to an example embodiment.

In the example implementation, the database server governance management module 564 includes machine-readable instructions that when executed by the database server processing unit 599 cause the database server 107 to perform the processes of the database server 107 described herein.
FIG. 6

FIG. 6 is a sequence diagram for explaining processing performed by the governance management server 100 of FIG. 1 according to an example embodiment.

At process S601, the governance management server 100 receives principal input from the principal devices 101-103. The principal devices 101-103 are included in a same governance group. The governance management server 100 generates governance permissions 240 for the governance group based on the principal input received from the principle devices 101-103, as described herein.

At process S602, the governance management server 100 receives unencoded governing activity information from the governing agent device 104, and obtains encoded governing activity information 241 that is generated from the unencoded governing activity information received from the governing agent device 104. The encoded governing activity information 241 is encoded as described herein.

At process S603, the governance management server 100 determines selection of the governance group of the principal devices 101-103.

At process S604, the governance management server 100 determines compliance of at least one governing activity specified in the encoded governing activity information 241 with the governance permissions 240 of the selected at least one governance group, as described herein.

At process S605, the governance management server 100 provides a governing activity compliance notification to the principal device 101 and the governing agent device 104, as described herein.

Principal-Agent Management Techniques

Principal-agent management techniques are described herein. For purposes of organization and clarity, the narrative in this section will mostly follow a chronology of principal-agent management steps: 1) create an unambiguously defined (and thereby neutrally enforceable) agreement on delegated governing activities, 2) monitor for and detect any deviation from the governing activity agreement by governing agents, 3) correctly review and then preempt, stop and/or remedy any deviations by governing agents, 4) punish deviation (prohibited behavior) and reward non-deviation (activity success) by governing agents, 5) incentivize collective action in regard to these preceding steps.

Principals and agents need standards, explicit and implied, for what governing activities and outcomes constitute a deviation from acceptable behavior. Ideally the performance standards and parameters are objective enough that they can be easily communicated and demonstrated to agents and third parties. In an example embodiment, a governance management server (e.g., the governance management server 100 of FIG. 1) may remotely collect, store and automatically aggregate inputs from individual principals in order to establish clear, common interest rules, such as choice set definitions, mandates and prohibitions, for governing agents to follow. These inputs may include survey or interview style questions, direct governing permission selections, real or hypothetical choices, rankings and any other specifications that help define shared and individual interests and generate effective aggregations and translations into mandatory, preferred and prohibited activities for governing agents. These settings may be set initially and be a persistent or general guide to governing agents or they may be made in a more timely or specific context in relation to particular governing activities or governing agent choices. Along with these user-specified settings, various default or fixed settings may also be provided and stored for constituents as in traditional inalienable rights and other conscionable governance guidelines along the lines of "no citizen has ever asked their government to do X to them" e.g. "waste their money" or "treat them badly". Standard common interest guidelines may also include cost-benefit calculations and universal priorities from the perspective of an objective consent or reasonable man standard and may incorporate fiduciary duty standards from corporate law, trust law and other useful doctrines. Over time some of these rules may adapt to the changing needs and priorities of principals but ideally they will always define a narrow and unambiguous choice set space between mandatory and prohibited actions for governing agents.

In an embodiment applied to public government this functionality provides for especially novel "constitutional law settings" as a robust method of establishing and maintaining detailed constraints on governing agents. This new constitutional technology framework provides safeguards to reduce the normal political manipulation of paper constitutions by governing agents and unfaithful interpretations by judges, either of which can cause traditional constitutional frameworks to possibly fail as a safeguard of the hypothetical agreement between principals and governing agents.

Once an agreement on agent activities has been defined, including ways to objectively identify deviations from proper governing activity performance, principals need ways to be able to "see" any potential deviations. Monitoring that can be distributed and performed in parallel across multiple principals can cover vastly more time and data space than possible with a single principal. A system for efficiently coordinating these monitoring efforts can leverage this kind of numerical advantage, allowing many small efforts to sum to a large total effort.

In an example embodiment, a governance management server (e.g., the governance management server 100 of FIG. 1) coordinates the decentralized efforts of principals to monitor governing agents, across all kinds of governing activity observations. The data captured and stored in these monitoring efforts may also be automatically organized, aggregated, analyzed and presented to users and others. With convenient remote input collection, distributed users can easily document and report any concerns or suspected or observed deviations as they are found in any field of operations or in the review of data, asynchronously.

In an example embodiment, the governance management server can also automatically allocate collectively large monitoring tasks into smaller parallelizable task chunks that can be easily completed by single users in brief sessions. By sharing progress reports and managing the assignment and monitoring of task completions by principals and other users, the embodiment can eliminate unnecessary duplication and undesirable redundancy in monitoring efforts. These crowd-sourced user inputs can then be automatically filtered or validated by leveraging the additional distributed input of principals or any third parties as desired in review, verification and other quality control processes as to these monitoring and detection functions.

Principals can benefit from access to tools to promptly address deviations from appropriate governing activity choices and benevolent governing agents want those tools to help limit mistakes and to prevent any temptations toward opportunistic behavior in their governing activity choices. There are many effective ways to limit governing activity deviations, whether due to accident or intent. One safeguard against impending future deviations is the retained right of the principal to a preventative intermediate review stage. An agent might independently analyze and select a particular governing activity on behalf of a principal, but the principal might explicitly approve or reject the activity before it can be implemented by the agent. A common safeguard against ongoing deviations is injunction: the retained right of the principal to command the agent to stop what they are doing at any time. A typical safeguard for completed deviations is damage remediation: the retained right of the principal to have deviations from appropriate governing activity choices reversed, undone or repaired by the agent, and at the agent's expense if deliberately or negligently caused.

In an example embodiment, the governance management server provides for a variety of these safeguards against future, ongoing and past deviations to be translated into coordinated individual and collective response systems that address detected deviations. In an example embodiment, the governance management server (e.g., 100 of FIG. 1) aggregates manual user analysis of governing activity, determines governing activity compliance and coordinates appropriate response actions, or uses automated analysis and automated response actions, or combines elements of both manual and automated analysis and response actions. These processes may also assign tentative or conclusive responsibility and liability to specific governing agents for governing activity deviations, and make permanent accessible records of the details of these agent's deviations. For contemplated or hypothetical actions, the governance management server (e.g., 100 of FIG. 1) may collect remote reviews, report cards, votes and other feedback that can be submitted at anytime from anywhere by principals. In some embodiments, the governance management server (e.g., 100 of FIG. 1) is constructed to perform automated processes for flagging and confirming potential deviations based on certain governing activity characteristics relative to the governing agreement as defined by principals. For example, specific standardized public interest objections to fiscal or policy decisions may be reported, such as unfair subgroup treatment or unequal benefits or harms. For recently approved or impending actions, safeguards may also include individual and collective veto processes with triggering thresholds for automatic validation and collective response initiation. In some embodiments, if a deviation has been completed or is ongoing before it is detected and validated, the governance management server (e.g., 100 of FIG. 1) provides for easy filing of claims for remedy by principals individually or as a group, and the governance management server provides for a process for collectively monitoring that remediation is accomplished.

Principals can benefit from ways to easily, credibly and consistently warn and punish governing agents for deviations, ideally with prompt, certain and meaningful punishments.

In some embodiments, the governance management server (e.g., 100 of FIG. 1) performs processes that can deliver automated punishments such as automatic withdrawal of individual or aggregated voting support or withdrawal of contributions to the common pool being governed. In some embodiments, the governance management server automatically generates punishments that may be delivered offline such as collectively triggered recall petition and legal complaint documents. In some embodiments, the governance management server performs tracking that can be the basis for paying bonuses, as for "perfect compliance" with general principal interests. These punishments and reward systems may be linked and applied to individual elected governing officials and governing staff, or groups of governing agents, like departments, agencies or political bodies.

The classic problem in large multi-principal and multi-agent governance arrangements is that of dispersed harms to all principals and concentrated benefits to some special group, such as governing agents. While millions of principals might be harmed by the actions of a small group of governing agents, typically no single principal is harmed enough individually that is in their own personal interest to take costly remediation action, especially when reform is uncertain or unlikely.

An embodiment may lower the individual cost aspects to incentivize collective action. By enabling participation in the governance arrangement from virtually any device (computer, tablet, smartphone, home phone, kiosk, etc.) (e.g., one of the principal devise 101-103) any time, and from anywhere, it becomes nearly effortless for principals to take individual action as principals. In some embodiments, the governance management server protects individual principals from possible retaliation by governing agents by preserving their anonymity in governance management system activities. In some embodiments, the governance management server automatically aggregates and coordinates private individual inputs and actions into collective action responses that benefit all principals, including with appropriate threshold participation triggers and other contingent but automatic commitments to take collective or delegated action on behalf of the group of principals.

In some embodiments, the governance management server may increase the individual benefit aspects to incentivize collective action. Participating principals may receive immediate gratification and positive feedback from the governance management server and their constituent peers. These benefits may range from simple voting acknowledgement, results sharing and thank you messages, to earning points and status, to direct influence on the behavior of governing agents that results in shared cost savings and/or value enhancement that may be recorded and reported. In some embodiments, the governance management server provides for more tangibly and differentially rewarding principals for individual efforts and contributions that make the governance management system work as well as it can. Thus, in some embodiments, the governance management server features an incentive system for user activity that may offer or automatically award tangible rewards linked to redeemable points, as well as badges, governance management system functionality, rewards, prizes, cash payments and other incentives that may increase activity by principals and others to make the governance management system operate more effectively.

There is no other technology or invention today that is explicitly designed to solve the problems of bad governance, especially as it relates to modern public government. In some embodiments, the governance management server offers valuable new ways for constituent principals to manage their governing agents and, being computer-implemented, may provide a continuously independent, trusted and anonymizing intermediary between principals and agents.

Civic Tasks and Staff Tasks

In any governance arrangement, that is to say where a group of constituent principals (two or more) have contributed resources to a common pool for common management (by governing agents), we can make a distinction between civic activities and staff activities. Civic activities are those typically performed by constituents, such as paying taxes or voting. Staff activities are those typically performed by governing agents, such as sending tax bills or running elections, as well as all the other day-to-day activities of employees and consultants or other subcontractors or sub-agents. Civic activities and staff activities may be considered categories of governing activities.

Persons who are constituent principals may also function in governing agent roles and vice versa, as for example in a city manager or other city government employee who works and lives (is registered to vote, etc.) in the same city so that a single person can perform both civic activities (voting) and staff activities (working on city projects) as appropriate to their role at the time.

At present the set of civic activities available to constituents in governance arrangements, especially public governance, is typically small and highly limited by cost and inconvenience to constituents. Thus also today, governing activities are primarily staff activities. In some embodiments, the governance management server manages simple new "civic tasks" that constituent principals can easily perform from their devices (e.g., one of the principal devices 101-103 of FIG. 1) to better manage their governing agents and produce better governance. In some embodiments, the governance management server provides much improved methods for principals to delegate, assign, monitor, review and incentivize "staff tasks" to be performed by governing agents.

In some embodiments, the governance management server provides one or more civic tasks to a group of constituent users (e.g., via one of the principal devices 101-103 of FIG. 1) for managing one or more staff tasks for one or more governing agents. For example, in some embodiments, the governance management server solicits a sequence of inputs from constituents (e.g., via one of the principal devices 101-103 of FIG. 1) on what governing activities governing agents should be performing with the common pool resources. A first input opportunity may ask users for suggestions on governing activities should be performed. A second input opportunity may process those results and ask users to rank or prioritize the governing activity suggestions. A governing activity that is highly ranked by users or highly ranked by other compliance scoring such as public interest value or return on investment might be automatically assigned to governing agents or might be submitted to users for affirmative assignment user input. In some embodiments, the governance management server then provides for one or more user monitoring inputs at some interval of time to ensure the performance of the assigned governing activity. This unique "task management system" functionality gives constituents the ability to bypass the need for governing agents such as elected officials to provide guidance or instruction to other governing agents. Governing activities may also be assigned to governing agents from traditional lines of authority and managed by an embodiment. In some embodiments, governing activities may themselves be "staff tasks" that may be performed from a governing agent device (e.g., one of the governing agent devices 104-106 of FIG. 1) in communication with the governance management server, such as entering governing activity information for constituent review or inviting constituents to join a governance management system provided by the governance management server (e.g., the governance management server 100 of FIG. 1).

In some embodiments, constituent user or principal interactions with the system (e.g., the system provided by a governance management server) may be organized primarily into activity modules that we can refer to as civic tasks. These civic task building blocks may be specific requests or opportunities for constituents to provide data or settings, answer questions, review information or provide other assistance or inputs via a principle device (e.g., one of the principle devices 101-103 of FIG. 1). These civic task modules may be standardized so that they only need to be scheduled or turned on or they may be customizable via inputs from an initiating user or process. Civic tasks can be simple modules, as in answering a single yes or no question or rating a service on a fixed scale. Civic tasks can also be more involved modules as in submitting a detailed suggestion for cost savings or making an unsolicited bid proposal to provide presently outsourced or insourced services. Civic tasks can also require more complex and iterative participation as in collaborative activities, scenarios, simulations or multiplayer game styled interactions.

In some embodiments, the governance management server provides incentives for participating in and completing civic tasks or other activities. Rewards, such as redeemable "civic points" or cash, may be earned at input submittal and/or various input review stages, and may be based on characteristics like correct or successful completion, the value of the contribution and the relative expected time and effort to complete the task. The allocation, reallocation and redemption of these rewards may be managed automatically by a governance management server (e.g., the governance management server 100 of FIG. 1), or the governance management server may interact with external systems or processes for reward management and fulfillment.

Data from interactions with civic tasks or other modules may be stored in a database (e.g., of the governance management server) and may include user inputs as well as any other characteristics of the interactions or the users. In some embodiments, the governance management server collects, processes and presents data via appropriate reporting modules. In some embodiments, the governance management server filters, processes, organizes, displays and communicates data to the original user and/or other users for further processing interactions. Processing interactions may involve single or multiple users, as in the review or collective rating by users of user submitted ideas or validation of public interest objections. In general the data processing modules may rely on manual analysis and interactions, as by users or third parties, or rely on automated analysis and interactions, or rely on both manual and automated components. In some embodiments, the data processing modules are included in the governance management server. As processing steps are completed (e.g., by the governance management server), data reports may then be made available with content and format as appropriate for constituent users, for governing agent users and for others such as the press or the general public.

The data outputs from the governance management server to constituent users (e.g., via one of the principal devices 101-103) may include data from civic task participation and results such as ratings, reviews, votes, discussion forums and so on. The data outputs from the governance management server to governing agents (e.g., via one of the governing agent devices 104-106) may include staff task performance feedback and ongoing guidance from constituents as to the proper scope and execution of governing activities, such as activity-based or proposal-based feedback and automatically generated compliance guides and checklists. Other outputs may include actionable and automatically formatted notices, demand letters, petitions, legal complaints or other documents or information by which principals may influence potentially uncooperative governing agents or otherwise address problematic governance activity by governing agents, constituent principals or third parties. By providing explicit authorizations and implicit guidelines from constituents to governing agents and making them generally available to third parties for review, the governance management server may also provide a dispute management forum for any perceived violations of constituent interests.

By empowering and incentivizing dispersed and distributed constituent principals to participate in the management of governing agents in new and more effective ways, the governance management server in accordance with embodiments described herein may solve governance challenges for principals that are applicable across all types of governing institutions. Similarly, governing agents who become users may benefit from unprecedented clarity and guidance as to what they are supposed to be doing and not doing for their constituents. The embodiments herein may provide for novel sources of timely and valuable feedback from principals that give governing agents the greatest ability possible to ensure that their governing activities are always creating value for all their principals and never destroying value for any.

Additional Embodiments

Additional embodiments are disclosed herein, and for organization and clarity follow a sequence similar to the principal-agent management techniques section above. The section headings provided are solely for organization of explanation and do not limit or otherwise restrict the scope of the invention. The scope of the invention may also include many other variations which are obvious to those skilled in the art. These embodiments may also include traditional administrative interfaces, user databases, management tools and other features which are commonly found in computer-implemented systems.

User Enrollment

In some embodiments, the governance management server provides for users to participate through open civic tasks that do not require users to be enrolled or registered. In some embodiments, the governance management server provides user registration for users to sign up become registered users which may earn points, join groups and otherwise have full participation in all civic tasks offered. A user may join a governance management system provided by the governance management server directly, before performing any civic tasks, or they may join after completing one or more civic tasks, such as answering a survey question, that may be open to nonregistered users.

Users may join a governance management system provided by the governance management server by creating an account linked to a unique email address or phone number and may secure the account with a password that may be entered by computing device or by phone. Users may contribute name, address, phone, email, age and other personal or demographic data into a profile that an embodiment may store and use to make user participation more valuable and informative to other constituent users and governing agents. Users may specify communications preferences for interacting with the governance management system (e.g., via one of the principal devices 101-103) or being notified by the governance management server, such as email, text message or voice call and may also specify the timing and method of notifications and other input prompts or reminders from the governance management server.

User information may be collected by the governance management server as part of a specific sign up process or as part of one or more civic task interactions. Users may also sign up using accounts from social media (Facebook, LinkedIn, Google+, Twitter, etc.) or other applications that may provide email address and other contact and demographic information directly to an embodiment. User profiles stored within a governance management system provided by the governance management server may be displayed using real names, using screen names or may be kept anonymous, depending on user preferences and depending on the settings desired or required for a specific civic task or reporting module.

Rewards such as civic points, may be awarded at various enrollment steps, including initial signup, the provision of personal and demographic information, inviting friends and socially sharing participation activity. Rewards may also be accrued by a user who interacts with a governance management system prior to creating an account, as by affiliating civic points with an unclaimed interaction session. Upon creating an account, the unclaimed rewards, such as civic points may then be transferred to association with the new user account.

In some embodiments, the governance management server provides one or more of a user dashboard, profile, history or other views from which the user may easily view their participation opportunities, accrued points, leaderboards, reward opportunities, personal data, privacy settings and so on, and from which they may edit, launch, close or take other action as appropriate relative to the information and input or action opportunities presented.

Governance Groups

A user may join one or more established "governance groups" in the governance management system, typically corresponding to offline communities of persons, or they may request or establish new governance groups. Governance groups may be overlapping and may be nested and hierarchical with subgroups based on interest, location, activity and other characteristics. Groups may be open admission, may have admission processes or membership requirements or may be invitation-only. Governance groups may coincide with jurisdictional governments or may create new governance arrangements where no offline formal governing arrangement exists, as with unincorporated areas of a county, or neighborhoods in a city. More generally, governance groups may any group of users that have some shared or common interests by which they may identify the group.

Users may invite and persuade other non-users to join a governance management system provided by the governance management server (e.g, 100 of FIG. 1), including their governance groups, by email or social media posting or website link or other messaging through or facilitated by the governance management server. Messages sent through the governance management server may be standardized or may include a customized message from the sender. Users may also invite existing users to join a governance group or an activity. User data, such as physical address or invitation source, may be used to identify for which a user may be interested or eligible, user data, which may also be provided by a source other than the user, may be used as the basis for automatic invitation. Users may self-certify the accuracy of their personal data. User data may also be manually or automatically validated, as with an API call, against public or private data or membership tests relevant to the governance group (such as voting records or property ownership data), for purposes such as data accuracy, membership verification or to confirm current eligibility or standing. User submitted data may also be supplemented or substituted with data from public or group records from other sources that may be imported into an embodiment. Once a user has enrolled in a governance management system provided by the governance management server, their status may be accessed or validated as appropriate by other users or other external systems using manual inputs or automated interfaces such as API calls to the governance management server.

Each governance group may have one or more governing agents associated with it to which reports may be configured to be directed. Governing agents associated with groups do not need to be enrolled as users, as the governance management server only needs their publicly available contact information to communicate with them one-way by methods such as email, text, facsimile or voice messaging. Governing agents associated with groups may also be governance management system users and may also be users to which one or more group or system administration activities are entrusted.

By design, the interactive participation of governing agents is not required by the governance management system in order for principals to be able to influence and improve governance by governing agents, especially in public governments. Nor are governing agents required to initiate or participate in any governance management system activities such as task assignment or activity reviews. Governing agent users may be encouraged to join and may themselves establish governing groups which constituent users and other governing agents may join.

The ongoing management or facilation of governing groups created or managed by governing agents or by constituents may be subject to the ongoing reviews and consents of the constituent users. In some embodiments, the governance management server provides for the revocation and reassignment of governing group management roles as appropriate to best meet the needs of constituents. Similarly, governing groups may be sponsored financially by a governing agency or they may be sponsored financially by one or more constituents or third parties.

Defining the Initial Governing Agreement (Agreement and Deviation Definition)

In some embodiments, the governance management server (e.g., 100 of FIG. 1) includes a class of modules designed to collect a detailed and unambiguous set of "constituent settings" from users (e.g., via a principal device 101-103) which may be used to define "governance permissions" such as the scope of delegated staff tasks, authority and priorities by which governing agents may be bound over time by their constituent principals.

With these constituent settings modules, one or more constituent users may provide one or more inputs (e.g., via a principal device 101-103) that relate to hypothetical, proposed, approved or actual actions or classes of actions of governing agents. Constituent user inputs may include opinions, answers, votes, approvals, rankings, allocations, prioritizations, consents, permissions, prohibitions, ratings, reviews, scores and other inputs relating to the actual or imagined behavior of governing agents, from day-to-day operations to fiscal and policy decisions or other governing activities. These inputs may be submitted via computing device (e.g., via a principal device 101-103) or other remote input device, at times of a constituent's choosing, as for example in regard to a possible policy scenario or other governing activity proposal under consideration by a governing organization. Or these inputs may be submitted in timely response to an input request from the governance management server, as in a prompted survey question. These individual responses may be stored in a database of the governance management server and associated with a user profile in a database of the governance management server, and inputs may be re-prompted, verified, branched and updated over time. While in general, input data can be either publicly accessible, private to the user or stored anonymously (without any link to or lookup by users), constituent setting data will typically be private to the user. In some embodiments, the governance management server uses these private data to generate public summaries of aggregated settings data, analogous to reporting of anonymous survey results.

In some embodiments, after a constituent user enrolls, the governance management server automatically initiates one or more constituent settings opportunities that users can interact with to start defining both general preferences and specific approvals and disapprovals. The governance management server offers basic and advanced constituent settings opportunities to further define and specify the details of governing agreements acceptable to individual users and these sequences may follow decision tree or wizard formats relevant to the settings topic. In some embodiments, the governance management server aggregates and process these stored individual user inputs into sets of "governance permissions" and "governance permission values" that can define activity mandates, prohibitions and priorities that apply at the governance group level to governing agents. These governance permissions may correspond to "constitutional" rules and "fiduciary duties" based on unanimous or near-unanimous individual user preferences, or to "policy" guidelines based on supermajority, majority and other levels of agreement or disagreement on importance among constituent users. Governance permissions and governance permission values solicited by or determined for one particular governance group may also be applied by default to other groups for which a user is associated or to which similar constituent goals may apply.

By branching questions and adding conditional clauses to settings interactions, the governance management server can move setting preferences towards more unanimous support and thereby provide more effective guidance for managing governing agents. Administrators may propose and implement these ongoing questions and clauses or users may propose or compete in proposing amended, branched and qualified constituent settings that evolve toward ever more unanimous support, including in competitions for rewards for the most unanimous proposals.

Universal constituent desires can be incorporated by the governance management server into default or even fixed (inalienable or immutable) constituent settings for all users, including future users, similar to how case judgments have defined fiduciary duty and other equitable doctrines in common law legal systems. These subjective preferences and objective settings may define sets of governing agent actions and procedures that are completely off-limits or completely safe harbors as well as actions and procedures that are only presumptively or tentatively off-limits or safe harbors. Use of an embodiment for feedback can itself become part of a process for establishing a safe harbor for behavior.

With constituent users (principals), such as citizens, explicitly specifying parameters for what they authorize governing agents to do and what they prohibit them from doing, the governance management server provides for a novel interactive "constitutional law" framework for governance that is not subject to traditional failure modes associated with court review or other self-interested governing agent interpretation or modification. Vague constitutional questions or questionable presumptions give way to concrete constituent settings and simple doctrines of conscionable governance permissions. Political battles and court manipulation become useless because governing agent authorizations or lack thereof can be derived directly from explicit constituent principal inputs and implicit universal demands. If and when necessary, queries for timely constituent inputs can directly void or disambiguate third-party interpretations of constitutional obligations with a final direct say as in "do you authorize your governing agents to do X to you or not?"

Participation Weighting

In some embodiments, the governance management server provides for user participation to be assigned one or more weighting settings based on characteristics relevant to the user or their associated governance group. These weightings may be used to generate reports or results summaries that are more useful than unweighted reports or results. For example, user voting weights might be assigned based on share ownership, property square footage or value, money fees paid or taxes contributed or other factors that may make individual or aggregate voting inputs more likely to produce good governance. Such voting weights might also assign one or more zero or one weights based on affiliation to a particular similarly situated subgroup so as to isolate different subgroup interests, as in owners vs renters, Series A vs Series B vs Series C stockholders, residents vs non-residents and so on. Using weighting to ensure that voting groups are similarly situated prevents the many failure modes that result from letting subgroup Group A vote to harm subgroup Group B or vice versa. In some embodiments, the governance management server safeguards against these traditional voting failure modes, particularly prevalent in public governments, such as by requiring both Group A and Group B to separately approve activities with disparate impact, so as to protect the whole group, subgroup and individual interests of constituents.

Participation weightings might also be based on accomplishing civic tasks such as reviewing educational materials or passing quizzes or earning points or other levels of status and accomplishment within an embodiment so as to give more weight to users who are more likely to produce higher quality inputs. Participation in certain tasks or roles might be restricted to users who have accomplished a certain number or variety of tasks or achieved certain levels of points or status. Weighting settings can also reflect user choices such as strength of belief or support. For example, weighting might be associated with an investment of points tied to an input such as a voting response, or weighting might be associated with a cash wager amount tied to a policy outcome prediction.

From Basic Settings to Prompted Inputs and General Feedback Modules

While some user interactions may help define and refine the constituent settings for the basic governing agreement, other interactions may help update the agreement over time and provide guidance in response to new or changing conditions in a governed community, or in response to specific issues that arise. In particular, constituent users (principals) may be prompted (by the governance management server via a principle device, e.g., 101-103 of FIG. 1) for timely or real-time inputs as to specific matters on a response timeframe of days or hours or minutes. As with other inputs, these timely inputs may be prompted by the governance management server using multiple communication methods such as email, phone and text messages, including notifications and reminders, and then responses can be immediately processed for reporting to constituents, governing agents and others.

Input requests may be created and launched by system administrators, governance group managers, constituents as a group or other individual users, including third parties such as independent auditors or experts. Input requests may also be scheduled in advance or launched automatically. Typically, a timely constituent consultation might be in response to a governing activity under consideration or one that has been recently approved by governing agents. Proposed or actual actions of governing agents might typically be directly reviewed or compared to alternative actions that could be or could have been taken.

In some embodiments, the governance management server enables constituents to be quite generally and routinely consulted on governance issues and questions between traditional elections, including at the specific requests of governing agents or other constituent users. Prompted inputs may include traditional survey or voting inputs or advanced techniques such as approval voting, instant runoff, score voting, range voting, preference ranking, participatory budgeting, dollar weighting and so on. Based on live constituent input data, a policy or other governance activity can be quickly evaluated for its compatibility with constituent interests.

In some embodiments, the governance management server may empower constituents with civic task modules for communicating feedback of many other kinds with or without being specifically asked by governing agents or other users. For example, while some inputs will be responses to expiring and time-limited requests, as in surveys or votes, other categories of inputs will be in response to persistent opportunities provided to rate, review, comment, suggest, complain and otherwise provide feedback to governing agents at anytime from anywhere using a variety of communication devices. Feedback might also be requested on a periodic schedule, or be linked to events, but it can generally be unsolicited and apply to any aspect of operations or policies and to any level of elected or appointed governing agent staff.

In addition to rating and review functions, feedback modules can address specific issues and governing activities as in budgeting and planning, performance reviews, constituent satisfaction, overall value, adherence to constituent needs, and so on.

Feedback modules might be simple single reactive responses or more complex submissions requiring investigation, analysis and/or creation of open-ended response content. As with other civic tasks and modules, points and other incentives may be rewarded for participation in feedback modules.

From Manual to Proxy Voting and Other Inputs

As described so far, in embodiments the governance management server enables a group of constituent principal users to provide inputs such as question responses and other useful feedback or inputs to governing agents at any time, from any device, anywhere. Giving constituents a persistent platform for voting inputs and other individual and collective communications to governing agents is a major improvement on the state-of-the-art wherein no systematic or convenient voting opportunities exist in the time periods between traditional multiyear election cycles. But other embodiments do even better than providing for many easy manual inputs from users. They provide for a user managed proxy system wherein a first user can revocably delegate to a second user the right and responsibility to exercise one or more of their manual inputs, such as voting, on the first user's behalf. With proxy delegation, constituent users can get their personal preferences reliably represented and submitted by someone else, without having to do any manual inputs or review of input opportunities. Rather than having to manually analyze an input opportunity and then make an input, an embodiment enables users to delegate responsibility for one or both of those tasks.

Constituent users may decide to assign some or all of their own participation and participation weighting to the inputs of other users who they select as their "proxy representatives". Proxy participation can be allocated for individual inputs or for slates or groups of inputs such as by category, topic, policy area, timeframe, governance group, civic task module or other characteristics associated with input opportunities. Constituent users may make themselves available to be proxy representatives for other users.

Users may also make their own recommendations or actual inputs available in a more limited proxy advisory mode where other users may view their votes and other actual or suggested inputs, for potential guidance. Proxy advisors essentially do the work of analyzing the input opportunity but not the actual voting.

An embodiment also provides for proxy-only users that are not governance group members but who can solicit and compete for proxy assignments from governance group members. Proxy-only users may be any individuals or institutions, including interest groups, that can generate vote responses or other inputs in response to particular input opportunities. A constituent user in one governance group may function as a proxy-only user in another governance group in which they are not a member. Like other proxy-soliciting users, proxy-only users may also (or solely) operate in a proxy advisory mode.

An embodiment also provides for communication between constituent users and proxy-soliciting users and for facilitating comparisons and competition among proxy-soliciting users as, for example, with openly accessible voting records and analysis frameworks and binding commitment statements that can be compared to voting behavior. As with proxy assignment settings, proxy-soliciting users may offer their services and compete by any category, topic, policy area, timeframe, governance group, civic task module or other characteristic associated with input opportunities. Proxy delegation may also include sub-delegation to other proxy representatives, managed by a primary proxy delegate. An embodiment also provides for the ability to assign to proxy delegates and sub-delegates some or all of the points or other rewards associated with participating in particular civic tasks on behalf of constituent users.

An embodiment also facilitates the matching of constituent users to appropriate proxy-soliciting or proxy advisory users. A constituent user's whole or partial voting record and other input data may be automatically and directly compared to that of proxy-soliciting or proxy advisory users to identify similarities and differences and create one or more similarity scores by topic or other input characteristics. Similarity scores for different proxy possibilities can be ranked and presented so that users can be given suggestions as to who might be an appropriate proxy representative or advisor for some or all of their voting and feedback interests, from topical to general. Similarly, an embodiment allows for proxy-soliciting or proxy advisory users to identify anonymized constituent users with high similarity scores and to send messages to constituent users so as to preserve user anonymity. Contacted users may then research and respond to compelling proxy delegation or proxy advisory offers as desired.

An embodiment also facilitates the review of proxy delegate and advisor activity for meeting ongoing performance expectations and general user satisfaction. Such a review system provides for user review of proxy delegate inputs for compatibility with expectations and for user satisfaction ratings to be assigned to proxy delegates or advisors. As an ongoing safeguard, delegated responses may be required on a timeframe that allows for a minimum additional review time period that gives a constituent user the opportunity to overrule any delegated response. An embodiment also provides for the revocation or switching of proxy delegation by constituent users at any time at their sole discretion.

An embodiment may provide penalties for proxy delegates that are deemed to have breached the trust or expectations of their constituents based on satisfaction ratings or other inputs, and these penalties may include revocation of points and other rewards, assignment of warning flags, revocation of proxy solicitation rights or user expulsion.

These proxy mechanisms of the embodiments described herein solve the traditional problem of enforcing genuine representation in delegated decision making, and can be a great improvement over traditional election of representatives and other officials in public governments.

Automated Voting and Other Inputs

These additional descriptions have so far disclosed embodiments for managing governing agent relationships that enables convenient direct participation by constituent users and even more convenient indirect participation through proxy delegation to other users. Having a highly qualified and trusted proxy delegate acting on a user's behalf can save significant user time and effort and thereby make user participation more widespread, making an embodiment more effective. But there is yet another level of improvement for which embodiments of the present invention provide: computer-automated responses on a constituent user's behalf.

Delegating responses to human proxy delegates may be the best option for some input opportunities and decision scenarios, but delegating responses to "proxy algorithms" can offer advantages in others. As with delegation to governing agents more generally, proxy representation failure modes can have two root causes: problems of motivation (agent incentives) and/or problems of information (agent knowledge). Personalized "voting robots" can be a solution for the human motivation and incentive shortcomings since robots only do what you program them to do. Smart robots that make good choices with artificial intelligence and expert judgment programming can be a solution to individual human knowledge and analysis shortcomings, especially since such robots can automatically learn and improve at their proxy job over time. With traditional artificial intelligence techniques known to those skilled in the art, proxy algorithms can be trained on voting patterns and other user inputs and can continue to learn from ongoing performance that is rated, overruled or corrected by users. Proxy algorithms may be designed to use any data available from inside embodiment databases or from outside sources of data.

Proxy algorithms can compete for constituent users in an embodiment just like human proxy delegates. Human proxy delegates may themselves find it useful to use proxy algorithms for some or all of their proxy response duties and also to publicize their use of proxy algorithms. An embodiment provides for making proxy algorithms public and open source for others to be able to verify their claimed functionality. Proxy algorithms may also be made available for cloning and modification and sharing so that they improve over time.

An embodiment also provides for requiring proxy algorithms to adhere to public spirited decision rules representing certain constitutional and fiduciary duties that all proxy and other response algorithms must obey in their responses to be eligible to participate in or exist in an embodiment. These standards may be tested, monitored and enforced with various response tests on hypothetical input opportunities and/or with code inspection and compliance and disclosure requirements.

Personal Robot Representation

A constituent user has the option of delegating input opportunities such as voting to other users or third-party proxy algorithms as explained above. Users may also create their own personal representation algorithms. These algorithms may make actual inputs on the user's behalf, like human proxy delegates, or they may be advisory to the user, who may have multiple personal advisory algorithms. Personal representation algorithms may copy or otherwise incorporate publicly available third-party proxy algorithms directly in whole in or in part. Personal representation algorithms may also include meta-proxy functionality that, for example, looks at what one or more proxy delegate users or proxy advisory users are doing and then uses that data to generate or suggest an input for the user. Personal representation algorithms may also have history-derived functionality that, for example, looks at what a user has done in the past as the basis for generating or suggesting inputs.

A record of a user's voting and other manual feedback and civic task participation data enables an embodiment to create a default "civic profile" for each user wherever sufficient activity data exists. These user models can then generate personalized representation algorithms by deriving decision rules based on past patterns of activity which may be supplemented by constituent settings entered directly. Specific response rules may also be set directly by users by responding to hypothetical scenario questions and providing other preference inputs, especially where preexisting data is sparse. As with third-party proxy algorithms, the responses of personal representation algorithms may be reviewed and refined over time based on their ability to correctly predict user responses to input requests and delegated inputs may be revised or revoked at a user's discretion.

With the adoption of one or more personal representation algorithms for their own use, an embodiment allows a user to establish a personalized "robot representative". Robot representatives can automatically assess how a user would respond, to a proposed policy for example, and then respond on the user's behalf accordingly. Sets of algorithms may cover general or specific issues for which a user might support, oppose or have no opinion/preference about, and their operation may be question or rule based, as in a preemptive survey answer rule like "No new taxes".

Personal robot representatives can also learn topical interests and priorities based on users highlighting their interest level up or down in different items and categories so that an embodiment can learn and monitor topics they might be most and least interested in participating in at different levels of effort. An embodiment allows for the robot representative to thereby create rules for manually, semi-automatically or automatically allocating and delegating a user's input efforts as desired across a portfolio that includes manual responses, proxy delegate responses, proxy algorithms and personal response algorithms. The result is a personal representation profile that maps various input opportunities to various input methods, which a user may also edit or manage directly.

Using personal robot representatives to vote automatically and otherwise execute on some or all constituent principal input opportunities can avoid the agency problem with human representatives and provide a level of predictability and user satisfaction that surpasses all other representation alternatives. Along with third-party proxy algorithm representatives, these competing and evolving personal governing agents can eliminate all of the incentive and most knowledge problems associated with human governing agents and other "representatives" in a governance arrangement. In particular, embodiments of the present invention have the ultimate design goal of augmenting and replacing traditional modes of human representative governance in public governments. Robot representatives can replace manual direct participation, as with traditional voting, and can eliminate the need for manual indirect participation as with traditional human representative government.

Governing Activity Encoding and Encoding Review

These additional descriptions of embodiments have so far provided for delegated representation by human and automated responses that can effectively and efficiently cover a wide range of voting opportunities and other input opportunities on behalf of constituent users. But embodiments are designed to even further maximize the usefulness and value of automated representation. In particular, in some embodiments, the governance management server provides for fiscal or policy proposals and other governing activities and decisions to be uploaded (e.g., by a governing agent device 104-106) and encoded in ways that facilitate very easy, reliable and thus widespread automated analysis. Automated constituent representation can function most broadly in conjunction with questions, proposals, actions and other governing activities on which input may be solicited that have been made machine readable and/or encoded with human analysis and data tagging.

For example, governing agents or other users may upload (e.g., by using a governing agent device 104-106) aspects of a hypothetical, proposed or approved fiscal or policy proposal or other governing activity into the governance management server and may encode it with classifications or other parameters that make the proposal more easily reviewed by algorithms. An example of encoding standards might include who pays what and who receives what or who benefits and who is harmed and how much. The format in which these encoding inputs are recorded and attributed may also include objective scoring of aspects of a proposal according to a checklist, or gradations for good government practices and universal constituent desires. An exemplary encoding might address issues such as universality of benefit, equality of burden, maximization value and minimization of cost, and so on, thereby generating a constituent or governance group "impact statement".

Other users may view and review (e.g., via a principal device 101-103) the accuracy of a proposal encoding to verify validity of encoding values and flag any misclassifications, thereby also flagging the user that is responsible for any misclassifications and generating reliability ratings for various encoding users. At the time of encoding, users may also manually flag perceived problems or objections to encoding or scoring of any kind and assign a problem or objection setting or other description of the perceived problems with or objections to the scoring.

Governing agents may also submit (by using a governing agent device, e.g., 104-106) a governing activity along with proposed encoding classifications and values for review of those classifications or values, or they may submit a raw governing activity description such as a policy, in a digital text or other machine readable format which may allow for automated analysis at the natural language level, or which may then be reviewed and encoded by one or more constituents or third parties. Constituents may also submit proposals (by using a principal device, e.g., 101-103) into the governance management server for encoding by themselves or other users. Encodings, including encoding values, may be compared and rated by other users for perceived accuracy and the highest ranked encodings for accuracy may become the accepted encodings. Once an accepted set of encoding classifications and values is assigned to a policy, it can be stored in the database (of the governance management server) as an encoded policy and becomes available for any kind of review or compliance scoring by users, proxy algorithms, personal response algorithms or any other automated analysis. In some embodiments, the governance management server suggests, prompts or requires standardized encodings and input formats, such as standardized form fields and questions that help ensure compatibility between proposal encodings and automated review algorithms and facilitate comparison between proposals.

Automated Policy Review

These additional descriptions of the embodiments have now provided for a computer implemented governance management system with input opportunities for constituents and for the delegated analysis of and input to these input opportunities, including delegation to humans or algorithms, and for encoding governing activities in ways that can facilitate rapid or automated analysis and review of compliance with constituent interests. In some embodiments, the governance management server performs processes for taking an encoded governing activity proposal as an input and performing an automated check of compliance with the recorded consents, prohibitions, needs, wants, preferences, priorities and other interests of constituents. Constituent demands are be stored (in the governance management server) as pre-specified governance permissions, fixed or default public interest requirements, individual user inputs, delegated and automated algorithms or other constituent settings. Constituent settings and other governing activity authorization, preference and prohibition data may be aggregated into governance permission values for an associated governance group.

An encoded governing activity may be submitted for automated review (by the governance management server) in one or more governance groups and the governance management server may return general pass and fail indications along with specific warning messages, error messages, scores or other compliance scoring results can be immediately generated and displayed (e.g., on a principal device or a governing agent device) as associated with any aspect of an action proposal that has been encoded and analyzed. An encoded governing activity may also be submitted to one or more users or proxy users or proxy algorithms via a principal device. In some embodiments, the governance management server allows for submission for review by one or more users, including proxy users or proxy algorithms, associated with one or more specific interest governance groups. One or more compliance scores may be recorded from each group for different aspects of the submitted governing activity and these compliance scores may be aggregated, processed and reported, in weighted or unweighted ways. Validations or disapprovals of aspects of proposed actions by users may be permanently recorded by the governance management server and used in reporting to other governance groups as well.

In some embodiments, the governance management server calculates and assigns one or more "civic score" settings based on the compatibility of an action proposal with one or more governance permissions. Such a civic score might be based on weighted or unweighted percentage of compliance in testing with constituent settings for a governance group. Based on this automated analysis and compliance testing, a policy might, for example, be automatically determined to 1) comply in whole, 2) be rejected pending modification of some elements or 3) be rejected outright based on fundamental conflict with constituent settings and governance permissions. A proposal might also pass an automated review and then be subjected to subsequent constituent review by the whole governance group or by one or more subgroups. This would apply when constituent settings might call for explicit consent or for tentative approval of proposal elements subject to constituent review and explicit consent. Where stored constituent demand data are insufficient for generating a reliable civic score, an uploaded and encoded policy may also be reviewed by users and said users may flag perceived compliance problems of any kind and assign warning or error messages or other descriptions of the perceived compliance problems, especially of the same kind that would be generated by the automated review.

In some embodiments, the governance management server tests an encoded proposal that originates in one governance group against the constituent settings from any other governance group or groups. Compliance scores may be returned that are based on data like the percentage of governance groups a proposal would pass or fail or the percentage of passed and failed elements across governance groups. In some embodiments, the governance management server provides for testing encoded proposals against hypothetical sets of governance permissions, which may also be created by users and approved by other users analogous to the creation of proxy delegation services. Over time the most successful proposals, as scored against various tests, may accumulate in an embodiment into portfolios of high quality fiscal and policy actions and other activity rules or guidelines that any governing agents might easily clone and adopt. Proposals may also be scored relative to these benchmark actions or best practice proposals in these portfolios.

Hypothetical proposals can also be tested (by the governance management server) and then manually modified by one or more users for retesting on one or more governance groups. In some embodiments, the governance management server automatically modifies or generates and tests new policy variations that may also be automatically varied and selected in an evolutionary process to achieve higher civic scores. The result is an automated policy testing environment that allows for competing and evolving better policies through variation and selective retention of winners.

While reference is sometimes made to "proposals" or "actions" above and below, it is only for purposes of prose narrative and not a limitation on embodiments of the present invention, as encoding and automatic review processes may apply to governing activities of any kind, whether imagined, hypothetical, proposed, approved, ongoing or past and including governing group rules and governing agent roles or choices such as hypothetical or actual fiscal and policy decisions and actions.

Supplementing and Replacing Politics with Software

In addition to providing for a novel constituent empowerment platform that enables live and ongoing constituent participation in managing any governing relationships, these additional descriptions of embodiments of the present invention have included additional features that enable rapid and automated review of governing agent behavior on behalf of constituent interests in any governance arrangement. Whether through rapid user feedback or more automated and instant feedback an aspect of some embodiments is the ability to do sequential and iterative inputs with questions and other inputs based on the results of previous inputs. This functionality enables a group of principals to perform governing activity optimization directly that would normally require participation from governing agents such as legislative representatives.

An embodiment of the invention can stand in for or take the place of elected representatives or traditional government. For example, some census designated places have no local government and are governed only as unincorporated parts of a county government. In such a case, citizens can use embodiments of the invention to create various governance permissions and use them to communicate governing activity demands to the county government without having any designated representative or local government. Elected representatives and other governing agents may take instructions from an embodiment or more generally use an embodiment to provide guidance in their decision making.

In fact, embodiments of the present invention also provide for specifically transforming public government and replacing politics with computers and software. Politicians of all stripes, dispositions and abilities can be replaced by faithful automated governance processes and personal robot representatives that are strictly constrained by public spirited decision rules and empowered with artificial intelligence. Below are some applications of how embodiments of the present may enable interesting and useful automation of public governance.

Vobots (Voting Robots): Users could have a direct say in governing processes throughout the year instead of relying on elected officials. These digital voting agents for individual constituents can be "programmed" to vote automatically or by remote control on material issues affecting constituents in-between elections. This kind of direct voting can broadly replace and minimize the need for representative decision-making.

Repbots (Robot Representatives): Users could have political representatives that were genuinely bound to only uphold the general interest of their constituents. These digital legislative agents could act predictably and reliably within various open source and public spirited rules and restrictions based on fiduciary duties and universally conscionable governance. They could always operate within enumerated delegated powers and responsibilities. They could only make choices that create value for constituents.

Judgebots: Users could have predictable and consistent automated "constitutional" review of public policies based on clear decision rules protecting constituents against damaging public policy. These digital diagnostic agents can automatically review policies and flag unconscionability, breaches of fiduciary duty or incompatibility with governance permissions and score them on rights infringements. They can serve as an immediate and rapid first review of policies for constituents.

Policybots: Users could harness their crowd sourced intelligence filtered through a digital management system analogous to wikis to propose and review policies and make good decisions whenever (or while) artificial intelligence and codified expert judgment is inadequate but learning. These semi-automated digitally managed processes leverage human creative and diagnostic intelligence to propose and review policies in conjunction with artificially intelligent agents.

Artificially intelligent robotic systems have brought higher speed, consistency and even superior performance relative to humans into manufacturing, stock trading, medical diagnostics and other complex behavior. Embodiments of the present invention bring these benefits to governance and especially to public governance. By letting automation do what humans do poorly for reasons of incentives and knowledge, these embodiments enable people to focus narrowly on what they can do best, in an alliance structured to leverage the strengths of both human and automated decision making.

Other Examples of Civic Task Modules (Monitoring and Deviation Detection)

In addition to the variety of constituent inputs mentioned above, embodiments of the present invention provide for a wide variety of civic tasks and other interaction modules to be offered within the governance management platform. With manual, delegated and automated inputs, constituent users are able to participate in many different modules and generate the data used to facilitate the definition, detection and deterrence of any governing agent deviations from constituent interests. These inputs may include activities such as providing assessments, descriptions, reviews, monitoring, suggestions, disagreements or ratings of governing agents and their ongoing decisions and activities. Rewards such as points may (or may not) be awarded for everything from completion to quality of input, and points may also be revoked for undesirable behaviors. For example, users may earn negative points or other punishments for certain actions such as breaches of civility in the process of completing civic tasks.

Civic task modules may require the inputs of one or more users, including third parties to a governance arrangement such as independent experts, and civic task modules may be combined or linked to achieve a desired outcome, as in user submitted inputs that are reviewed and edited by other users and then submitted for a vote to a group of users. While some civic tasks are ideally performed by governing agents, they are all designed to be able to be done by constituent users on their own as necessary, in the spirit of true democratic governance.

Civic tasks and accompanying incentives may be used to prompt action by constituent principals and governing agents not only online but offline. While online task completion may be automatically verified, offline task completion may be self-certified by users or verified to an embodiment by third parties, or verified to an embodiment through automated techniques such as entering one or more inputs during or related to an activity, such as taking a picture with or scanning an onsite code in a particular time window. Activation of civic task modules may be initiated by constituent users or governing agent users and the modules may be time-limited, manually terminated or of perpetual duration. Civic tasks may be open or limited to governance group members or subgroups or subsets or supergroups or supersets of governance groups or other groups of users. Civic tasks may even be independent applications that are incorporated into an embodiment's civic task and civic points processes by API or other modularized interaction protocol and may also be open sourced, cloned, modified and competed within an embodiment, similar to proxy algorithms.

In some embodiments, the governance management server includes a large number of specific civic task modules that may be deployed, including the following specific and categorical examples, many of which may inform or improve constituent settings or governance permissions or provide monitoring, review or incentivizing functions.

Simple Response Modules:
Likes or Dislikes: −1, +1, Like or Dislike, Agree or Disagree, Applaud or Boo, Love or Hate, etc.
Weighted Likes or Dislikes: −1 or +1 scaled by points expenditure or user total
Compliment or Complain: 1- or +1 plus text field option
Ratings: Rate anything 1-5, Satisfactory to Unsatisfactory, etc.
Rankings: Compare and order things by some characteristic
Reviews: Rate anything plus a text field option
Surveys: Answer one or more survey questions
Feedback: Open ended question answers or comments
Vetoes and Kudos: Flag something as bad/good and disapprove/approve
Votes: Vote to approve or disapprove one or more policies or people
Unvotes: Withdraw a vote to approve or explicitly disapprove one or more policies or people
Status: Ongoing satisfaction score with governing operations (when status falls below a certain threshold number automatic penalties for governing agents may be triggered)
Invite a Friend: Invite one or more people to join an embodiment by email, text, etc.

Learning/Teaching Modules:
Quizzes: One or more questions
Lessons: Read educational text or watch video
Training: "Course" combinations of text, audio/video and questions about the governed community and governing operations, for constituents and governing agents
Academy: "Degree" (badge) combinations of civic courses and civic lessons Contributive/Creative Modules:
Questions: Submit one or more informational or survey questions
Answers: Answer one or more informational or survey questions
Did You Knows: Submit one or more informational facts for sharing
Comments: Comment on a survey question, quiz, statement or issue
Suggestions: Suggest a valuable improvement or cost savings
Reports: Report a problem
Forums: Raise an issue for discussion and discuss
Invitations: Invite users or non-users to join a governing group
Causes: Identify something desirable or undesirable and organize for approval or disapproval
Petitions: Create joinable petitions for some specific action System Feedback: Complain about system administration of an embodiment by governing agents or others Offline Actions: Perform some offline task that may be certified or verified to an embodiment Offline Collective Actions: Participate in some offline group activity Complex/Interactive:

Contests: Single field competitions with other users, like naming

Competitions: Single form competitions with other users, like project ideas

Open bids: Forms for unsolicited offers to outsource something the governing agents are doing Proposals: Forms for solicited offers to do something on an outsourced basis Savings Suggestions: Suggestion forms with typical reward of cash based on percent of first-year savings Proxy Offers: Descriptions of proxy services, advisory and delegation options, offered to users Hearings: Users review information (text/graphics/audio/video) relevant to governing agent decisions and may provide feedback User Created: Users may suggest and/or define and create their own civic task processes Governing Agent Focused:

Election: Use a voting methodology to appoint one or more governing agents

Recall: Use a voting methodology to terminate one or more governing agents

Replace: Use a voting methodology to replace one or more governing agents with new ones Shadow Support: Pledge support, withdraw support, or pledge anti-support for elected or appointed officials based on their actions Oppose: Disapprove and withdraw funding or other authorization subject to other people also withdrawing funding or authorization Invalidate: Disapprove and withdraw funding or authorization for one or more enumerated reasons compatible with universal constituent interests Requests for Help/Volunteers: Posts for help in the governance community Budget Builder: Prioritizations, A vs B rating competitions and approvals/disapprovals to allocate collective funds among choices with cost and benefit tradeoffs Cost/Benefit Estimates: Data driven analysis of possible or actual governing agent activities Constituent Impact Statements: Encoding and scoring of possible or actual governing agent activities relative to constituent interests Fairness Opinions: Data driven analysis of the degree of equal and fair treatment of all constituents at the hands of governing agents Policy Wizards: Question driven workflow guides for making good policy Policy Checklists: Step-by-step instructions and guides to making good policy Policy Predictions and Assessments: Ex ante and ex post assessments to compare predicted results against actual results Shadow Meetings: Interactive forums that (pre)discuss the same issues as in-person meetings and may include inputs such as votes and comments in the time between the agenda posting and the public meeting Politician Assessments: Individual politician proposals and predictions are solicited, rated and wagered ex ante and then scored relative to predicted effects or actual results ex post Civic task opportunities may be visually displayed to users (via a display of a principal device), typically on a web page, an email or a computing device application. They may also be presented aurally, as in a phone call that prompts for inputs. Civic task modules may be persistently available for users to complete anytime, or they may be expiring with a limited timeline for completion and display. Civic task opportunities may also be accompanied by online and offline notifications such as by email, text, voice or other means such as digital display signs or traditional printed materials which may be posted, handed out or mailed.

Data Processing and Reporting Modules (Preempt, Stop and Remedy Deviations)

In some embodiments, the governance management server provides for the data collected from various civic tasks to be automatically processed and reported to constituent users, governing agents and others to assist in the definition, detection or deterrence of any governing agent deviations from constituent interests, including the anticipation, stopping or remedying of deviations. Raw inputs from civic tasks are typically anonymized and processed into aggregated summary results, including charts, graphs, tabulations and statistics, for viewing by constituent users, governing agents and others.

Raw constituent inputs may be filtered, cross-tabulated and weighted for presentation in various reports. Similar to the examples of participation weighting characteristics that were described previously, filtering might be done by weights or other attributes such as by property ownership, by location, by tax paying status, by registered voter status and any other useful characteristics. Other filtering or weighting might include number of years as a resident, tax dollars paid, property value, age, gender, and so on, including responses to inputs. While user weighting and other result sorting parameters may be available, reports of input results may be presented with and/or without the incorporation of any weighting, filtering or other cross-tabulation or processing.

In some embodiments, the governance management server imports or collects data from other systems (e.g., the database server 107), such as financial, accounting, agenda, legislative, calendar, blogging or other data and records that may be of interest to constituents using an embodiment. These data may be used or reported within civic tasks and may also be used in reports that may also include civic task input data.

In some embodiments, the governance management server generates summary reports specifically designed for presentation to governing agents or constituent users. These may summarize or reference data that identifies potential or actual conflicts between constituent interests and governing agent actions. Reports may also be automatically generated in the form of "civic alerts", warnings, checklists and compliance guides for governing agents to help them ensure ongoing compliance with constituent interests. Reports may also solicit and incorporate inputs and analysis from third parties such as independent auditors or experts.

Reports can also be used or generated for communications with non-users, including governing agents, the media and the general public. In addition to being easily accessible and displayed within an embodiment, reports may also be directly distributed by various automated methods such as by email, text messaging, web posting, automated mailing or phone calls to governing agents and other users or non-users, and may be sent from an embodiment directly or on behalf of users, automatically or on demand.

Reports may also include comparisons or benchmarking among users or governance groups. For example, governance communities might be compared or ranked based on their participation, activity levels, policy compliance, constituent satisfaction and on other community or public interest scores that might be assigned based on measures of importance to constituent users. Comparisons and scores may be graphically displayed so as to show good, OK and bad performance or behavior on absolute scales and/or in relative comparison to others.

Generating Consequences for Ignoring the Public Interest (Rewards and Punishments)

In some embodiments, the governance management server provides for data to be used to more directly incentivize and motivate actions by governing agents. Automatic report generation may include governance data and analyses such as potential or actual conflicts between constituent interests and governing activities, and such data and analyses may be incorporated into text-based documents. These automatically generated "motivational" outputs may be created in formats such as a press release, a demand letter for injunction or remediation of an activity, a public hearing agenda request and notice, a recall petition, a class-action legal complaint for breach of fiduciary duty or other action-oriented document templates. Similar types of outputs may also enable and coordinate the online or offline behavior of constituent users, as with demonstration notifications, boycott recommendations, public hearing reminders or form letter writing campaigns.

In some embodiments, the governance management server performs processes to publicize various scores or governance metrics that may be ranked and posted on leaderboards or loserboards for governing agents as individuals or groups, based on their adherence to serving their governing group interests. These classifications may include banding for Excellent, Good, OK, Bad, Awful or other summary descriptions of governing agent performance. These metrics may also include data such as cost, value and other performance benchmarks, such as totals of money wasted or saved. An embodiment provides for governing agent performance to be linked to rewards and penalties for users within an embodiment, and performance data may also be presented and incorporated into traditional offline performance reviews and bonuses or into termination clauses for user or non-user governing agents.

In some embodiments, the governance management server tracks governing agents across different jobs or governance groups over time as with other lifetime tracking methods, like credit reports. These may include histories of their proposals, votes for and against policies and expenditures, and other good or bad governing agent behavior as it has been rated within an embodiment. Scores can be based on individual or group assessment prior to a policy effect being known or after it has been established. Scores may be updated whenever a proposed or implemented policy, expenditure or activity is rated. An embodiment also provides for procedures for ensuring accurate governing agent report records, including error correction, appeal and amendment processes analogous to a credit or consumer reports for their governing services.

Governing agents need not be enrolled as users to be associated with governing groups or to be targets for behavior modification or to have their behaviors tracked over time, as an embodiment only needs a profile based on any available contact information to associate activities or communicate with them as for example by email, text facsimile, voice or automated mailing An embodiment may send messages to cajole, warn, inform, praise or inspire governing agents to their publicly accessible contact nodes. A message may be suggested by an embodiment or user suggested and created, prerecorded (including by notable voices), launched from user accounts, staggered or simultaneous and may also go in parallel or as notifications to the general public and press.

Governing agents may use embodiments to help credibly commit themselves to desirable behaviors by making specific public commitments to governing activities in the interest of constituents that may be inputted and then easily monitored and punished by constituents. Potential governing agents, such as candidates for a governing agent office may also use an embodiment to make similarly credible pledges or commitments. In general, governing agents may also commit themselves to one or more specific motivation or punishment processes that help them achieve behavior desired by constituents.

Incentivizing Constituent Participation (Collective Action Incentives)

While many constituent users will be sufficiently motivated by civic duty or other "sense of duty" norms associated with a governance group, additional usage of an embodiment and governance effectiveness can be achieved with a rewards framework linked to participation. Thus, in some embodiments, the governance management server provides for intangible and tangible rewards linked to participation that may be assigned to civic tasks and other interaction modules when they are created or launched. An embodiment provides for intangible rewards based on points, status, badges and other user-earned designations and privileges. These may be linked to or redeemed for tangible rewards or raffles for tangible rewards offered through a governing agency, other users or third parties. Tangible rewards may be purely commercial and transferable in nature but, to be most compatible with civic spirit, they are preferably unique to a governance community and not generally for sale, such as lunches with officials, operational ride-alongs, meeting invitations, preferred parking, expedited service, recognition plaques and other valued experiential, unique and operations-linked offerings. Award levels or amounts may be manually or automatically increased or decreased based on the activity levels observed by users relative to a desired level of activity. Promotional award levels and campaigns can also be set to incentivize specific activities on specific timeframes. An embodiment provides for users to control redemption of rewards that they are eligible for or to automatically be assigned tangible rewards.

Civic task opportunities and associated rewards may be managed and easily viewed by constituents along with other user and governance group information from a "constituent dashboard", but users may also benefit from being notified or prompted to participate and earn rewards. Standard notifications and reminders may be sent from an embodiment by email, text, voice or other automated messaging and they may also be user specified or scheduled. An embodiment may also send motivational notices that leverage intangible group peer pressure as an incentive and promotional emails such as "complete this civic task today, earn bonus points" that include a link to a page associated with the civic task module.

Specific Governance Applications

Embodiments of the present invention as described herein may have broad application across numerous governance arrangements and applications, from private to public institutions. Some examples of governance arrangements with constituent principals and their governing agents who can benefit from one or more of these embodiments include:

Citizens and their public governments and agencies

Utility district and other service district customers and their district directors and management Property owners and their owner association or property management agencies Businesses/customers and their customer service or arbitration or dispute settlement agencies Shareholders of publicly traded companies and their directors and management Owners and stakeholders of other businesses with large share/ownership bases (coops, partnerships, etc.)

Trade association members and their management

Donors to non-profit entities and their directors and management

Students/parents and the management of their educational institutions

Members and the management of various clubs, leagues, associations, unions, churches, etc.

Additional Example Illustrations and Descriptions

FIG. 7

Figure 7:
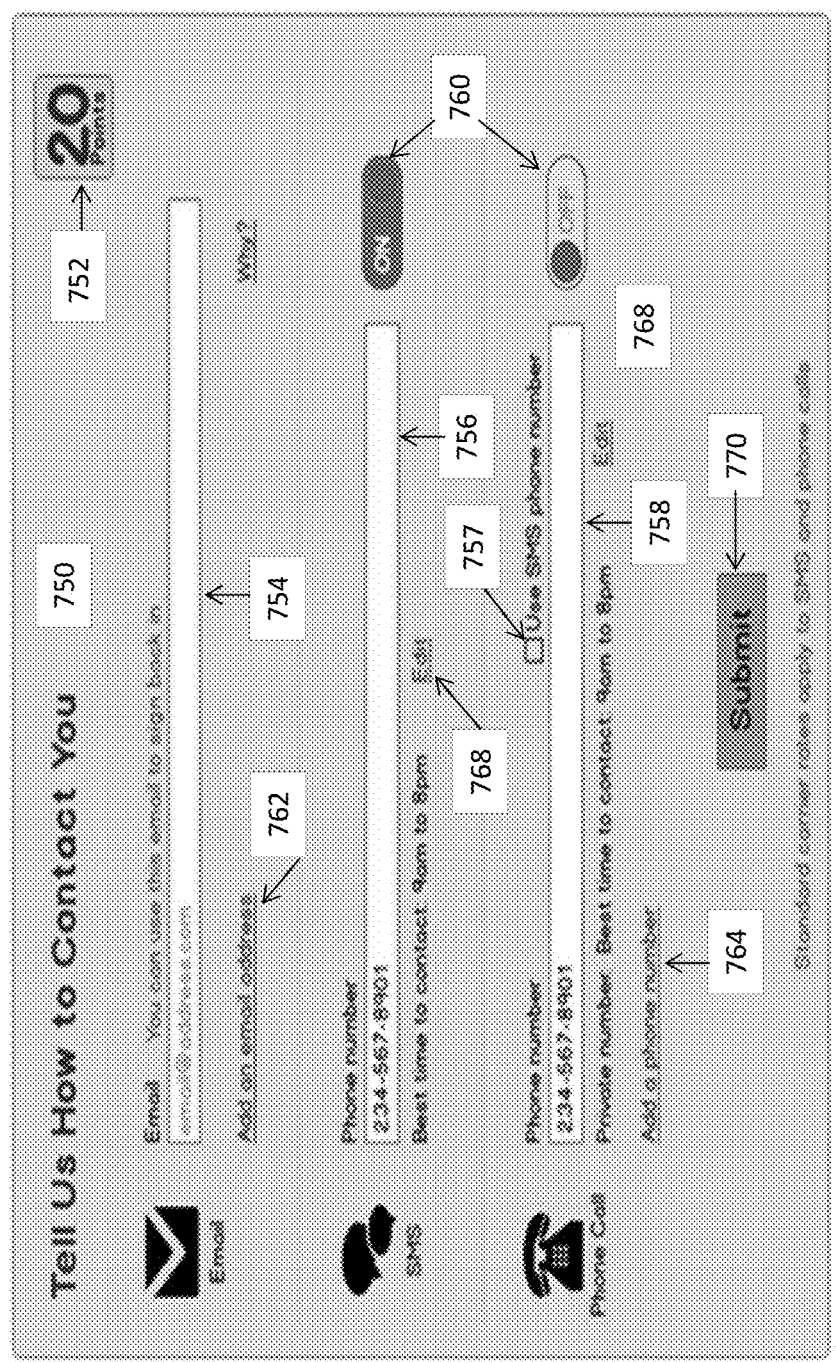
FIG. 7 is an example illustration of civic task incentive information in the context of user management of communication modes with an embodiment.

FIG. 7 illustrates an example of user management of communication modes and incentives for interacting with a governance management system provided by the governance management server (e.g., 100 of FIG. 1) in accordance with embodiments. A communications settings task module 750 is shown that includes a civic points offer 752 for completing the task module. The module includes a field for an email address 754. The module also includes a field for an SMS (text) message phone number 756 and a field for a voice call phone number, 758. The user may check a box 757 to populate the voice number field with the same data as the text number field, as might be desired with a mobile phone. The module also includes a toggle setting 760 for enabling or disabling a particular communication mode. A user may have multiple email addresses which may be added from a link 762. A user may have multiple phone numbers which may be added from a link 764. A user may also use a link 68 to set the allowed times for an embodiment to contact them by either text message or by phone. When the module is completed a user may click on a button 770 to input the data to the governance management server.

FIG. 8

Figure 8:
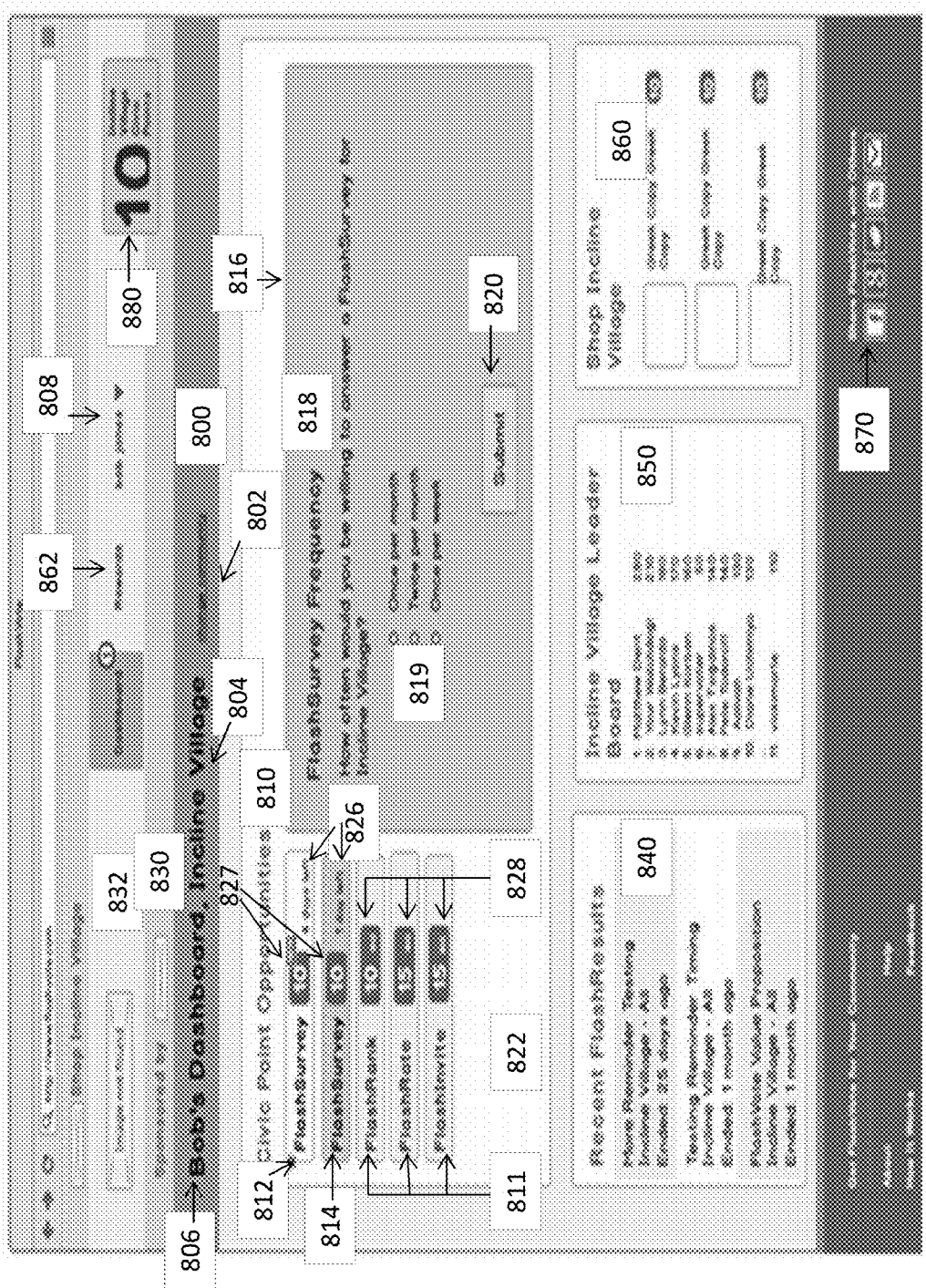
FIG. 8 is an example illustration of civic task information and civic task incentive information in the context of a constituent user dashboard interaction with an embodiment.

FIG. 8 illustrates an example of a constituent user dashboard view 800 that includes an area for showing open civic tasks and for completing tasks 810, an area for showing the user's current point total 880, an area for recognizing a governance group sponsor 830, an area for showing recent user or group activity 840, an area for showing a leaderboard of other users 850, an area for showing examples of reward options 860, and an area for social sharing links 870.

The dashboard includes an identifier for the current governance group 804, a link for changing to a different governance group 802, a user identifier for the dashboard 806, and a link with the username that links to user settings 808. The dashboard also includes a link to a view showing rewards 862 and an area for displaying a governance group logo or other visual identifier 832.

In the area for showing available civic tasks and completing tasks 810 there is an area for showing available civic tasks 822 and an area for completing civic tasks 816. In the area for showing available civic tasks there is one new civic task 812 whose expiration date 826 shows it expiring in 4 days and one civic task whose expiration date 826 shows it expiring in 1 day 814. These two expiring civic tasks also display the points that can be earned by completion 82. There are also three ongoing (no expiration) civic tasks 811 at the bottom of the stacked list that each display the points that can be earned by completing each instance 828. The civic task that expires in one day 814 is a survey 818 that is active and displayed in the area for completing civic tasks 816. The active survey task 818 may be completed by clicking on a button in the radio butting group 819 and clicking on button to submit the input 820.

FIG. 9

Figure 9:
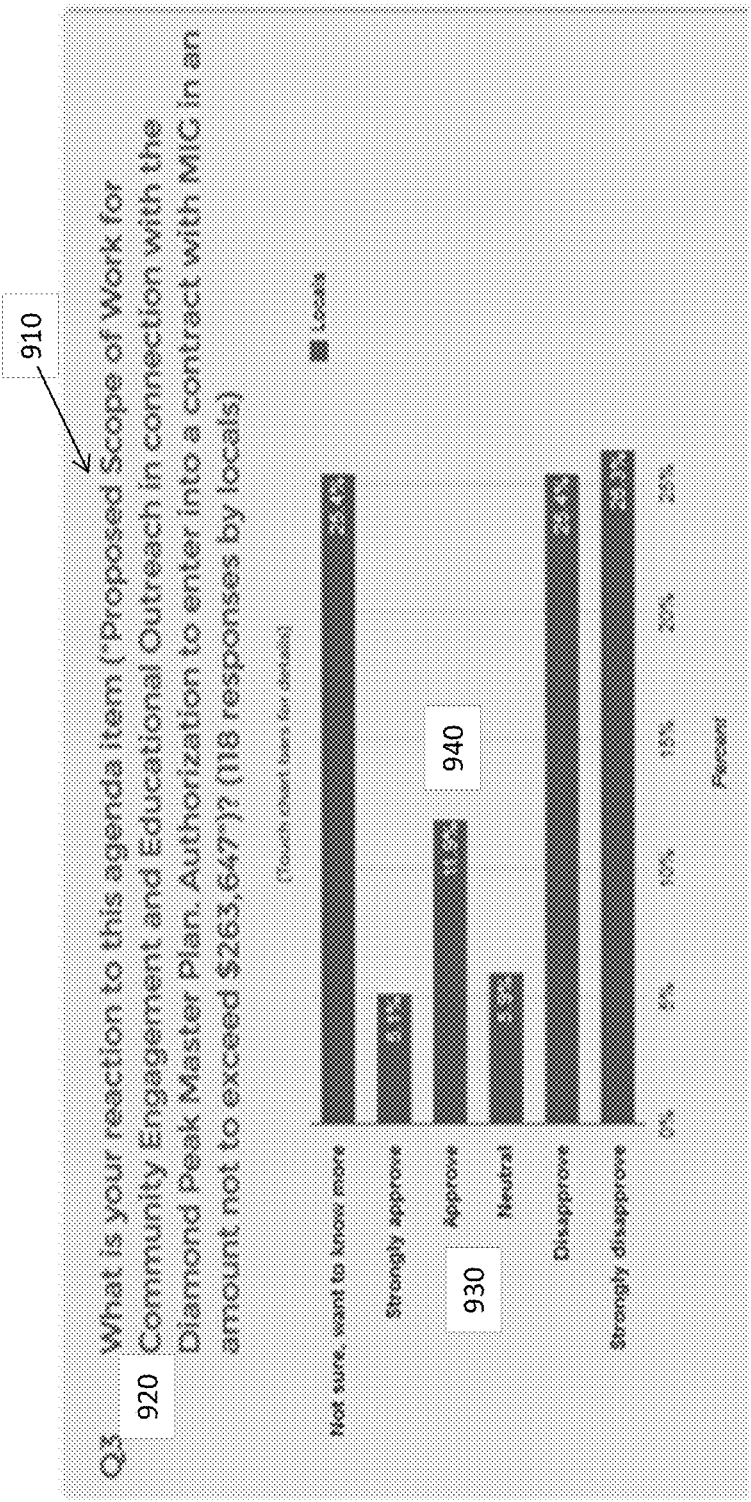
FIG. 9 is an example illustration of results data, collected from a governing activity review by principals, that may set values for a proposed governing activity.

In one example embodiment of the invention, one or more agenda items relating to governing activity may be transferred into the governance management system after publication of a meeting agenda by governing agents. Referring to FIG. 9, an agenda item 910, in this example one concerning the governing activity of "to enter into a contract with MIG in an amount not to exceed $263,647", may be presented to the constituents for review and response in a question format 920, with a set of response choices 930 and results 940. An embodiment like this may set the response period for constituents at a fixed number of hours or days, typically in an amount calculated such that the response period begins after publication of an agenda item and ends prior to the meeting for which an agenda was published, thus enabling the results 940 to be automatically processed and reported prior to the scheduled meeting start time.

FIG. 10

Figure 10:
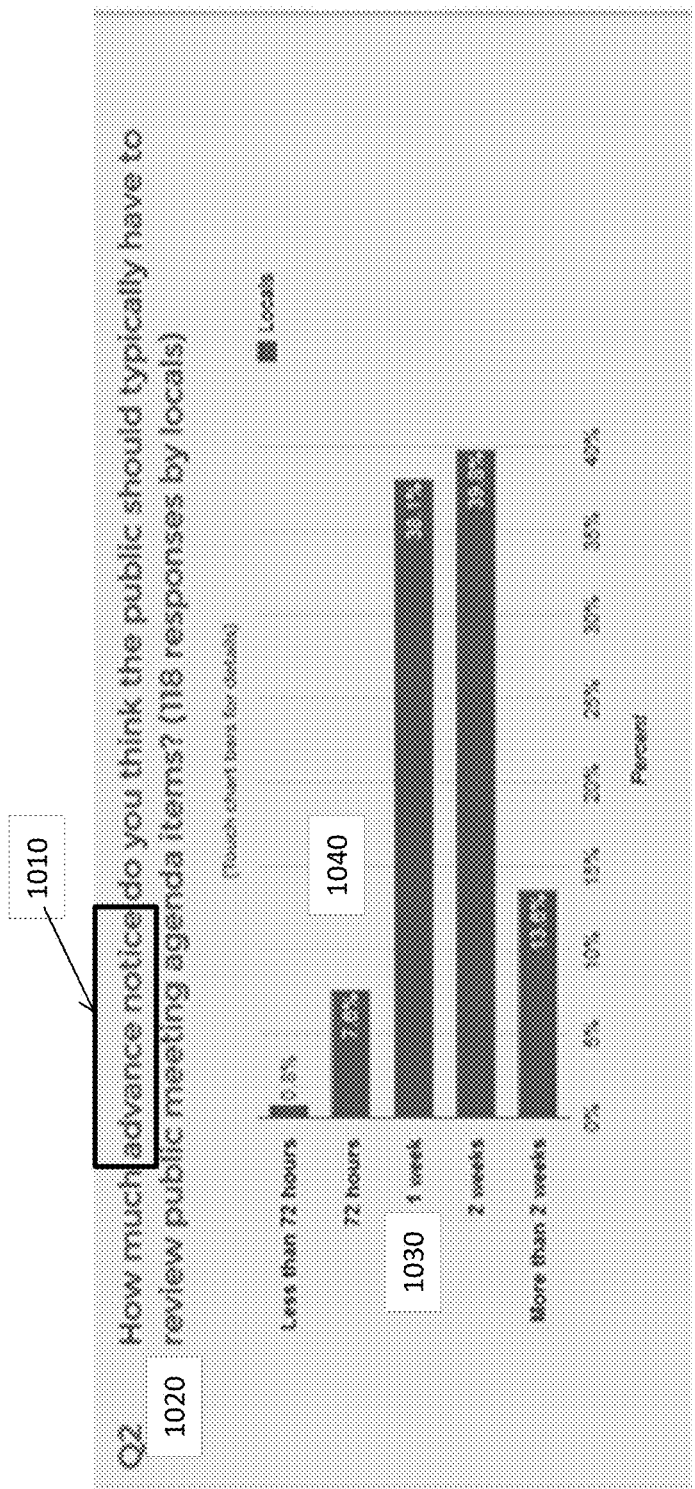
FIG. 10 is an example illustration of results data, collected from a governing activity review by principals, that may be used to establish governance permissions for an aspect of a governance arrangement.

Referring to FIG. 10, we see an example embodiment where governing activity information, including the rules or procedures that govern the governance processes themselves, may be input into the system for user review and response, and then results may be reported. The governance activity information 1010 in this example is a minimum "advance notice" time requirement for public noticing of a meeting agenda. Such governance activity information may be presented to the constituents in a question format 1020 with a set of response choices 1030. When the time period for responses has ended the results 1040 may be automatically processed and reported. In this example, a new or updated governance permission for "advance notice" may be determined from the inputs. As this example illustrates, if no governance permission has been previously set for a governing activity, principals may be queried for information that may be used to generate governance permissions for the governance group.

FIG. 11

Figure 11:
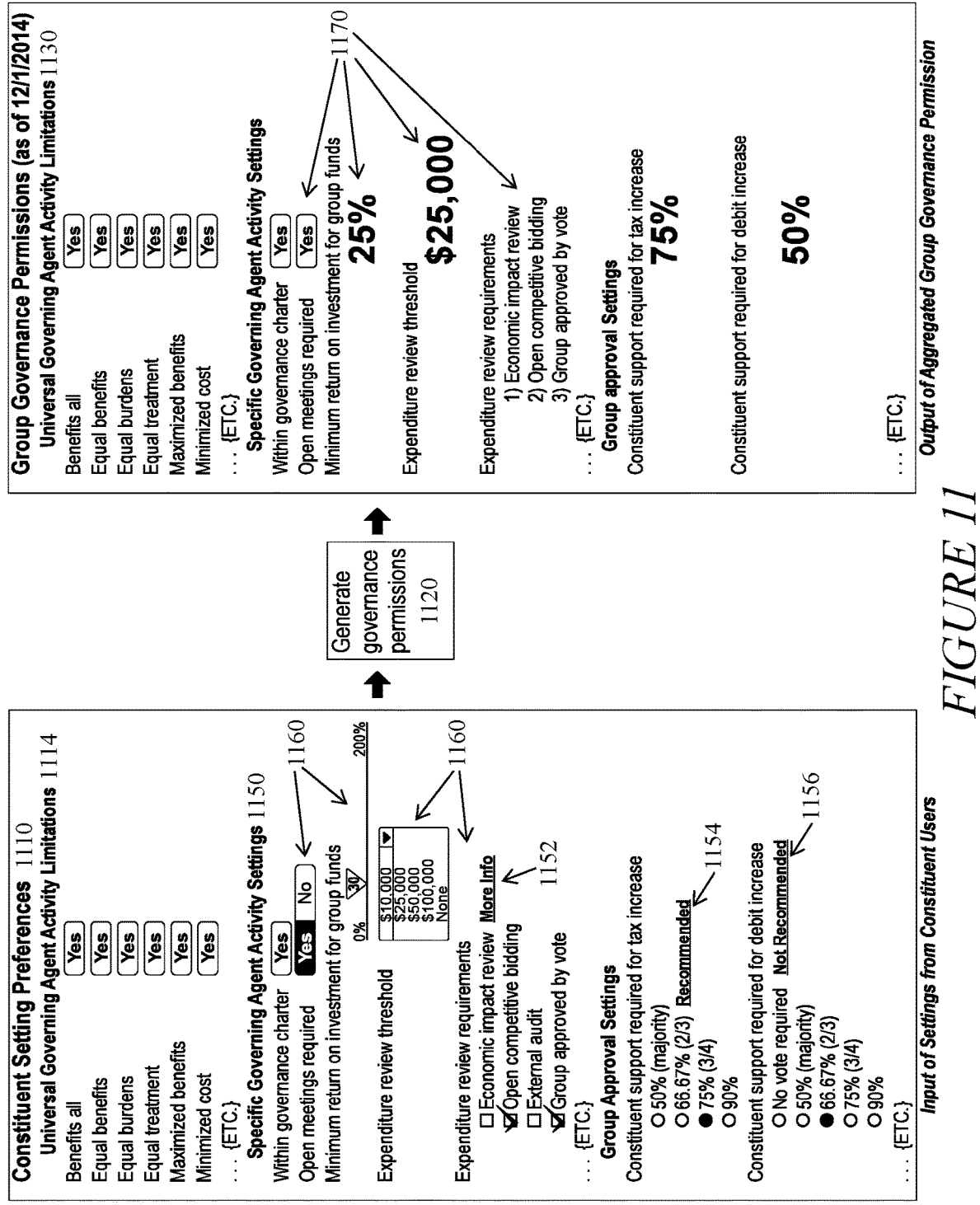
FIG. 11 is an example illustration of an embodiment comprising a processing unit of a governance management server generating governance permissions for at least one governance group, the governance group including at least one principal of a governance principal-agent relationship, the governance permissions for each governance group being generated from received principal input from at least one principal device of a principal of the governance group.

Referring to FIG. 11, we see an example embodiment comprising a processing unit of a governance management server generating governance permissions for at least one governance group, the governance group including at least one principal of a governance principal-agent relationship, the governance permissions for each governance group being generated from received principal input from at least one principal device of a principal of the governance group. A set of principal inputs 1110 comprised of settings which may be collected from one or more users that are then processed 1120 into a set of governance permissions 1130 that may be applied to the activities of the governance group, including its governing agents. The constituent settings may be separated, as illustrated, into subcategories such as Universal, Specific, and Group Approval settings. For example, the settings in the Universal subsection 1140 may not be user selectable or adjustable. Other settings, such as those exhibited in the Specific subsection 1150 may be fixed or user specified, as for example with drop down menus, button selections, radio buttons, check boxes, sliders, open text or number fields, question answers and so on. Additional information associated with settings may be provided, such as explanations, best practices, benchmark data, or recommendations, or links such as illustrated with a "More Info" link 1152, a "Recommended" tag and link 1154 and a "Not Recommended" tag and link 1156. The processing 1120 of principal inputs 1110 into governance permissions 1130 may be achieved through various techniques and calculations such as means, medians, minimums, maximums, pluralities, majorities, specific percentile responses, weighted sums or other methods for mapping one or more inputs 1160 to a single governance permission output 1170 as appropriate to the characteristics of a governance permission. For example, a single user may individually specify governance permissions for a whole governance group, as for example with a business incorporator, or multiple users may collectively specify their individual preferences for processing into governance permissions for a governance group. The governance permission outputs 1130 may be reported to users through the system and to nonusers as desired through automated formats such as email, text message, web posting, text-to-speech, facsimile, automated mailing and other means.

FIG. 12

Figure 12:
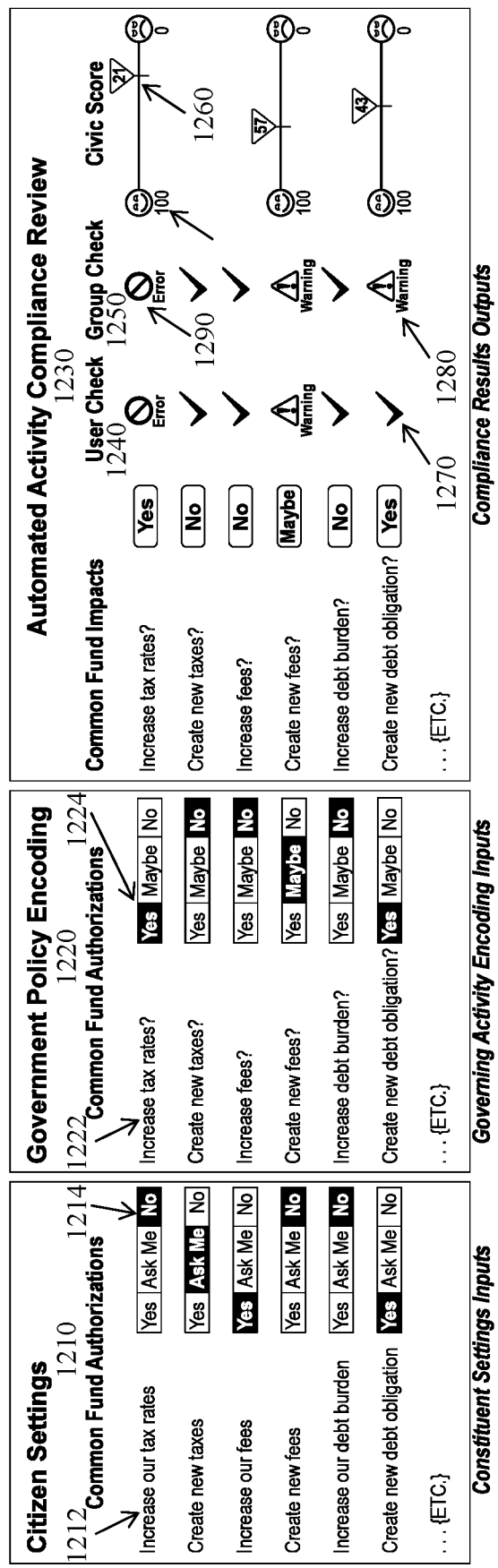
FIG. 12 is an example illustration of constituent settings inputs generating governance permissions information and interacting with encoded governing activity information and producing governing activity compliance information that includes individual user and governance group compliance scores.

Referring to FIG. 12, we see an example illustration of constituent settings inputs generating governance permissions and interacting with encoded governing activity information and producing governing activity compliance information that includes individual user and governance group compliance scores, in an embodiment designed for public government. We see citizen settings inputs (principal inputs) 1210, public government policy (governing activity) encoding inputs 1220, and an automated compliance score report 1230, based on a comparison of the encoding inputs 1220 and the citizen settings 1210 for the governing activity, which in this case is a public government policy. We can also see an example of a governance permission 1212 and a corresponding value 1214. In this example embodiment, we also see how a governance permission 1212 may matched to an encoding classification 1222 that may be made available to the user, who is encoding the government activity into the system by selecting an encoding value 1224. The citizen settings 1210 may be compared to the governance permissions requirements to generate governing activity compliance information 1230, with an example of result representation under the User Check heading 1240. The citizen settings may also be aggregated with other citizen settings (as illustrated and discussed previously in FIG. 11 for constituents more generally) to create governance permissions for a governance group and these may be used for comparison to the authorizations required for an encoded government activity 1220 to generate governing activity compliance information for the group, with an example of result representation under Group Check 1250. Additional details from the comparison of governance permissions to encoded governing activity information may be reported, as illustrated by a compliance score example shown as a Civic Score 1260 corresponding in this example to a percent of users whose individual settings would authorize the policy as encoded. The automated report of governing activity compliance information may also display check marks 1270, warnings 1280, errors 1290 and other icons and messages as appropriate to summarize or communicate results.

FIG. 13

Figure 13:
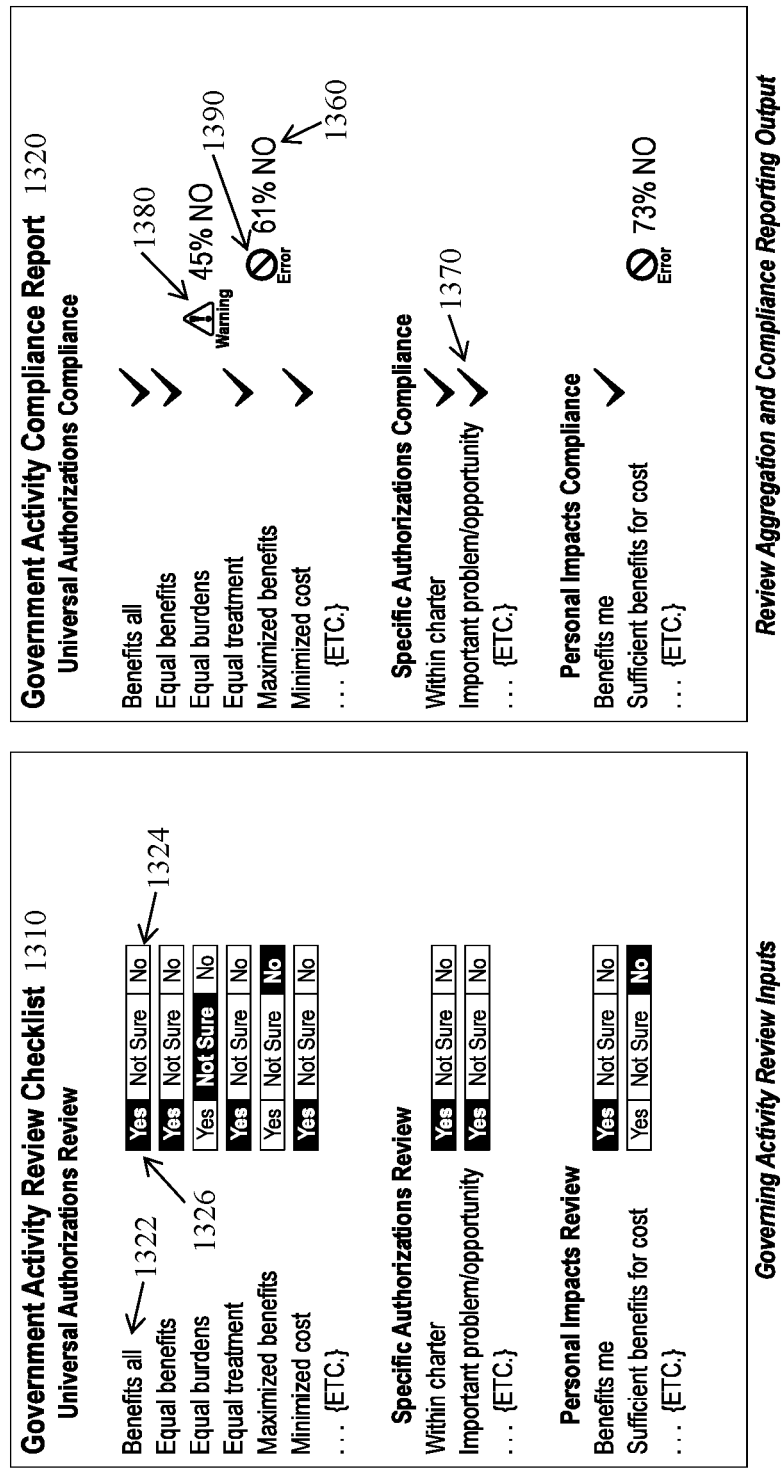
FIG. 13 is an example illustration of constituent settings inputs that are based on governance permissions that have default compliant values that may be used to generate governing activity compliance information that includes governance group compliance.

In another example embodiment of the invention, constituent settings inputs that are based on governance permissions, which have default compliant values, may be used to generate governing activity compliance information that includes governance group compliance. Referring to FIG. 13, we see an example illustration of encoded governing activity information 1310 based on a checklist derived from governance permission information (some of which was also illustrated in FIG. 11). We see that next to each governance permission 1322 is a set of governing activity encoding values 1324 from which a specific value 1326 may be selected by a user who reviews the governing activity, in this case for a government policy. In this case the corresponding value to each governance permission that is compliant is "YES" by default and does not depend on user selection of a governance permission value. Thus when the encoded governing activity information is created by selecting values 1324 using the checklist 1310, the encoded governing activity information from the checklist 1310 may be used to generate a compliance report 1320 that may display aggregations, comparisons, compliance scores and other governing activity compliance information, such as a percentage of users who selected a governing activity encoding value of "NO" 1360. The automated compliance report may also display check marks 1370, warnings 1380, errors 1390 and other icons and messages as appropriate to summarize or communicate results. Note that this embodiment may generates governing activity compliance information even though the governing activity may not have been previously encoded by any user and users may not have provided governance permission values. In another embodiment the encoded governing activity information from multiple users may be compared for consistencies or divergences with respect to particular inputs made by different users in reviewing and encoding the same governing activity.

FIG. 14

Figure 14:
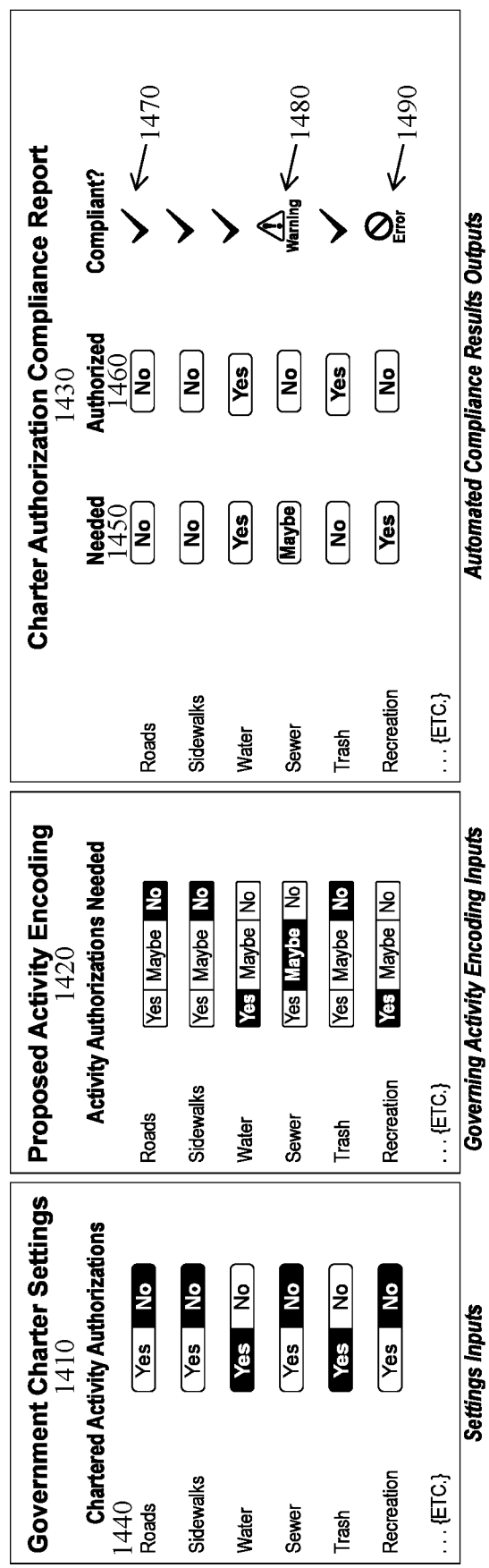
FIG. 14 is an example illustration of governance charter information interacting with encoded governing activity information and producing governing activity compliance information.

In another example embodiment of the invention, parameters from governing group charters, such as city charters, constitutions, corporate bylaws or other formational, foundational or organizational documents may be encoded into the system so that one or more encoded activities may be automatically compared to a set of authorized activities. Referring to FIG. 14, we see an example of governance charter information interacting with encoded governing activity information and producing governing activity compliance information. A local government charter has been encoded into governance charter information 1410 that, in this case, corresponds to one or more categories of activities 1440 which the local government is legally authorized to perform and which may automatically become or function as governance permissions. Encoded governance activity information 1420 is shown that comprises a set of inputs made by a user who reviews and analyzes a governance activity that, in this case, is a proposed government activity. A comparison of the governance charter information (activity authorizations) 1410 to the encoded governance activity information (activity authorization requirements) 1420 generates governing activity compliance information which is shown as a Charter Authorization Compliance Report 1430. This report includes a column of charter values 1450 and column of encoding values 1460 for visual comparison of data and a column that may display check marks 1470, errors 1480, warnings 1490 and other icons and messages as appropriate to summarize or for facilitate rapid compliance inspection or communication. An embodiment may display other compliance data as appropriate.

FIG. 15

Figure 15:
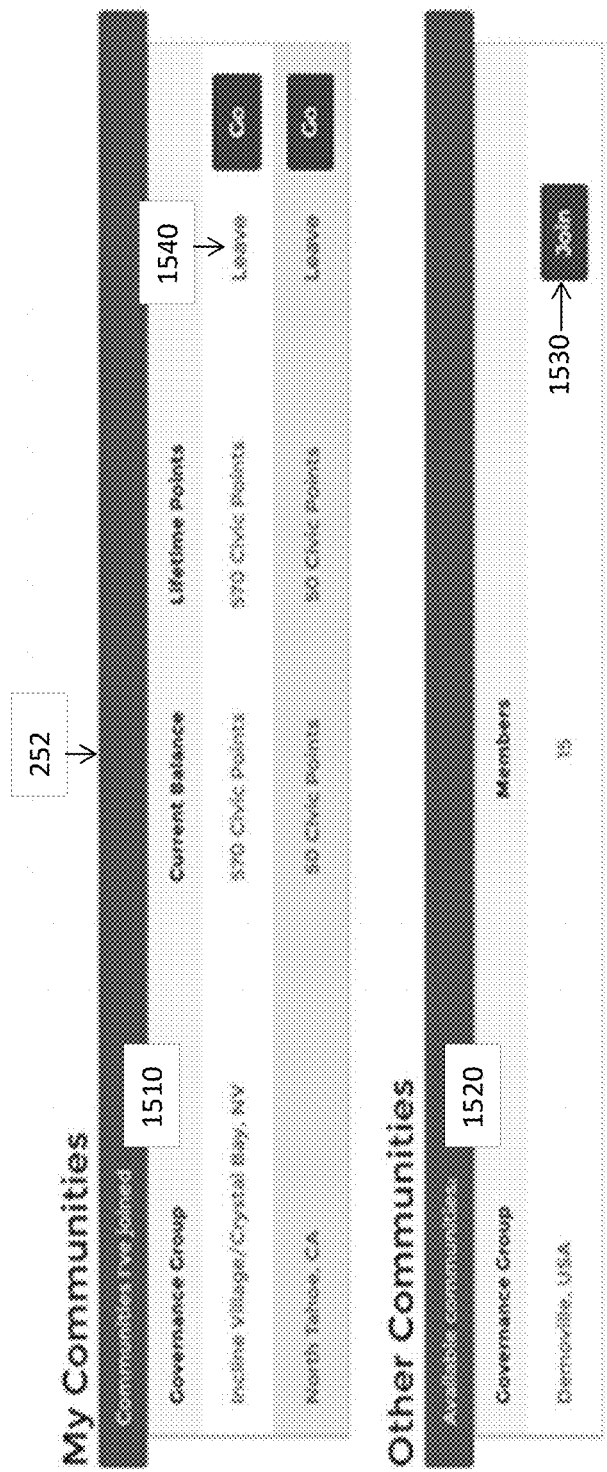
FIG. 15 is an example illustration of a governance group management module.

Referring to FIG. 15, we see an example embodiment of a governance group management module 252. The example shows a set of governance groups that a user has joined 1510 and another group that the user is eligible to join 1520. A user may join a communities at their discretion using a button 1530 or leave a community using a link 1540.

Conclusion

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A system comprising:
  a governance management system comprising:
    a network adapter device;
    a main memory;
    at least one processor coupled to at least one machine readable medium, the machine-readable medium comprising machine-executable instructions, the machine-executable instructions executed by the at least one processor for
      a proxy system that is executed by the at least one processor to provide delegation of voting to at least a first proxy algorithm that is executed by the at least one processor to generate computer-automated vote responses on behalf of a first constituent user and a second proxy algorithm that is executed by the at least one processor to generate computer-automated vote responses on behalf of a second constituent user; and
      the first proxy algorithm, executed by the at least one processor to generate computer-automated voting responses on behalf of the first constituent user, the first proxy algorithm being trained on voting patterns of the first constituent user by using artificial intelligence techniques, wherein training the first proxy algorithm on voting patterns comprises deriving decision rules based on past voting patterns, wherein voting patterns of the first constituent user are received via the network adapter device from a respective first principle device external to the governance management system, wherein the governance management system is uses the at least one processor to
    generate the plurality of vote responses by using at least the trained first proxy algorithm and the second proxy algorithm,
    compare a first document received from a first governing agent device with stored permissions and each of the plurality of vote responses, and
    provide a result of the comparison to the first governing agent device;
  the first governing agent device;
  the first principal device associated with the trained first proxy algorithm; and
  a second principal device, associated with the second proxy algorithm,
  wherein the governance management system is constructed to communicate with the first governing agent device, the first principal device and the second principal device via the Internet by using the network adapter device.

2. The system of claim 1, wherein the first principal device is executed by at least one first principal device processor to provide user input to the governance system for generation of the stored permissions.

3. The system of claim 2, wherein the second principal device is executed by at least one second principal device processor to provide user input to the governance system for generation of the stored permissions.

4. The system of claim 3, wherein the governance system includes the stored permissions.

5. The system of claim 3, wherein the governance system stores the result of the comparison.

6. The system of claim 5, wherein the governance system provides the result of the comparison to the first principal device.

7. The system of claim 6, wherein the governance system provides the result of the comparison to the second principal device.

8. A method comprising: with a governance management system:
  delegating voting to a proxy algorithm that is constructed to generate at least one computer-automated vote response on behalf of a delegating constituent user;
  receiving voting patterns of the delegating constituent user via a network from a principle device external to the governance management system;
  training the proxy algorithm on the received voting patterns of the delegating constituent user by using artificial intelligence techniques, wherein training the proxy algorithm on voting patterns comprises deriving decision rules based on past voting patterns;
  with the trained proxy algorithm, generating the at least one computer-automated vote response;
  comparing a first document received from a first governing agent device with stored permissions and the at least one computer-automated vote response; and
  providing a result of the comparison to the first governing agent device.

* * * * *